US012462190B2

(12) United States Patent
Ivenso et al.

(10) Patent No.: US 12,462,190 B2
(45) Date of Patent: Nov. 4, 2025

(54) PASSIVE INFERENCING OF SIGNAL FOLLOWING IN MULTIVARIATE ANOMALY DETECTION

(71) Applicant: ORACLE INTERNATIONAL CORPORATION, Redwood Shores, CA (US)

(72) Inventors: Ikenna D. Ivenso, Austin, TX (US); Matthew T. Gerdes, Oakland, CA (US); Kenny C. Gross, Escondido, CA (US); Guang C. Wang, San Diego, CA (US); Hariharan Balasubramanian, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1008 days.

(21) Appl. No.: 17/463,742

(22) Filed: Sep. 1, 2021

(65) Prior Publication Data

US 2023/0075065 A1 Mar. 9, 2023

(51) Int. Cl.
*G06N 20/00* (2019.01)
*G06F 11/34* (2006.01)
*G06F 17/18* (2006.01)

(52) U.S. Cl.
CPC .............. *G06N 20/00* (2019.01); *G06F 17/18* (2013.01); *G06F 11/3452* (2013.01)

(58) Field of Classification Search
CPC ...... G06N 20/00; G06F 17/18; G06F 11/3452
See application file for complete search history.

(56) References Cited

U.S. PATENT DOCUMENTS 3,705,516 A 12/1972 Ries
4,686,655 A 8/1987 Hyatt
(Continued)

FOREIGN PATENT DOCUMENTS

CN 107181543 A1 9/2017
CN 110941020 A1 3/2020

OTHER PUBLICATIONS

Patent Cooperation Treaty (PCT), International Search Report and Written Opinion issued in PCT International Application No. PCT/US2020/060083 having a date of mailing of Mar. 19, 2021 (13 pgs).
(Continued)

*Primary Examiner* — Mark D Featherstone
*Assistant Examiner* — Jeffrey Andrew Yang
(74) *Attorney, Agent, or Firm* — Kraguljac Law Group LLC

(57) ABSTRACT

Systems, methods, and other embodiments associated with passive inferencing of signal following in multivariate anomaly detection are described. In one embodiment, a method for inferencing signal following in a machine learning (ML) model includes calculating an average standard deviation of measured values of time series signals in a set of time series signals; training the ML model to predict values of the signals; predicting values of each of the signals with the trained ML model; generating a time series set of residuals between the predicted values and the measured values; calculating an average standard deviation of the sets of residuals; determining that signal following is present in the trained ML model where a ratio of the average standard deviation of measured values to the average standard deviation of the sets of residuals exceeds a threshold; and presenting an alert indicating the presence of signal following in the trained ML model.

20 Claims, 9 Drawing Sheets

(56) References Cited

U.S. PATENT DOCUMENTS

| | | |
|---|---|---|
| 5,619,616 A | 4/1997 | Brady et al. |
| 5,684,718 A | 11/1997 | Jenkins et al. |
| 7,020,802 B2 | 3/2006 | Gross et al. |
| 7,191,096 B1 | 3/2007 | Gross et al. |
| 7,281,112 B1 | 10/2007 | Gross et al. |
| 7,292,659 B1 | 11/2007 | Gross et al. |
| 7,391,835 B1 | 6/2008 | Gross et al. |
| 7,542,995 B2 | 6/2009 | Thampy et al. |
| 7,573,952 B1 | 8/2009 | Thampy et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,150,655 B2 | 4/2012 | Dhanekula et al. |
| 8,200,991 B2 | 6/2012 | Vaidyanathan et al. |
| 8,214,682 B2 | 7/2012 | Viadyanathan et al. |
| 8,275,738 B2 | 9/2012 | Gross et al. |
| 8,341,759 B2 | 12/2012 | Gross et al. |
| 8,365,003 B2 | 1/2013 | Gross et al. |
| 8,452,586 B2 | 5/2013 | Master et al. |
| 8,457,913 B2 | 6/2013 | Zwinger et al. |
| 8,543,346 B2 | 9/2013 | Gross et al. |
| 8,983,677 B2 | 3/2015 | Wright et al. |
| 9,093,120 B2 | 7/2015 | Bilobrov |
| 9,514,213 B2 | 12/2016 | Wood et al. |
| 9,911,336 B2 | 3/2018 | Schlechter et al. |
| 9,933,338 B2 | 4/2018 | Noda et al. |
| 10,015,139 B2 | 7/2018 | Gross et al. |
| 10,149,169 B1 | 12/2018 | Keller |
| 10,452,510 B2 | 10/2019 | Gross et al. |
| 10,496,084 B2 | 12/2019 | Li et al. |
| 10,860,011 B2 | 12/2020 | Gross et al. |
| 10,929,776 B2 | 2/2021 | Gross et al. |
| 11,042,428 B2 | 6/2021 | Gross et al. |
| 11,055,396 B2 | 7/2021 | Gross et al. |
| 11,255,894 B2 | 2/2022 | Wetherbee et al. |
| 11,392,786 B2 | 7/2022 | Gross et al. |
| 2003/0061008 A1 | 3/2003 | Smith et al. |
| 2007/0288242 A1 | 12/2007 | Spengler et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0077351 A1 | 3/2009 | Nakaike et al. |
| 2009/0099830 A1 | 4/2009 | Gross et al. |
| 2009/0115635 A1 | 5/2009 | Berger et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0080086 A1 | 4/2010 | Wright et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2012/0111115 A1 | 5/2012 | Ume et al. |
| 2013/0157683 A1 | 6/2013 | Lymberopoulos et al. |
| 2013/0211662 A1 | 8/2013 | Blumer et al. |
| 2015/0137830 A1 | 5/2015 | Keller, III et al. |
| 2016/0098561 A1 | 4/2016 | Keller et al. |
| 2016/0258378 A1 | 9/2016 | Bizub et al. |
| 2017/0163669 A1 | 6/2017 | Brown et al. |
| 2017/0301207 A1 | 10/2017 | Davis et al. |
| 2018/0011130 A1 | 1/2018 | Aguayo Gonzalez et al. |
| 2018/0276044 A1 | 9/2018 | Fong et al. |
| 2019/0064034 A1 | 2/2019 | Fayfield et al. |
| 2019/0102718 A1 | 4/2019 | Agrawal et al. |
| 2019/0163719 A1 | 5/2019 | Gross et al. |
| 2019/0196892 A1 | 6/2019 | Matei et al. |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0378022 A1 | 12/2019 | Wang et al. |
| 2020/0125819 A1 | 4/2020 | Gross et al. |
| 2020/0191643 A1 | 6/2020 | Davis |
| 2020/0201950 A1 | 6/2020 | Wang et al. |
| 2020/0242471 A1 | 7/2020 | Busch |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2022/0121955 A1 | 4/2022 | Chavoshi et al. |
| 2024/0376813 A1* | 11/2024 | Sharma ............... E21B 47/008 |

OTHER PUBLICATIONS

Patent Cooperation Treaty (PCT), International Search Report and Written Opinion issued in PCT International Application No. PCT/US2021/015802 having a date of mailing of May 28, 2021 (13 pgs).

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.

Patent Cooperation Treaty (PCT), International Search Report and Written Opinion issued in PCT International Application No. PCT/US2021/014106 having a date of mailing of Apr. 26, 2021 (9 pgs).

Patent Cooperation Treaty (PCT), International Search Report and Written Opinion issued in PCT International Application No. PCT/US2021/015359 having a date of mailing of Apr. 9, 2021 (34 pgs).

Wald, A, "Sequential Probability Ratio Test for Reliability Demonstration", John Wiley & Sons, 1947.

Whisnant et al; "Proactive Fault Monitoring in Enterprise Servers", 2005 IEEE International Multiconference in Computer Science & Computer Engineering, Las Vegas, NV, Jun. 27-30, 2005.

U.S. Nuclear Regulatory Commission: "Technical Review of On-Lin Monitoring Techniques for Performance Assessment vol. 1: State-of-the-Art", XP055744715, Jan. 31, 2006, pp. 1-132.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Gross, K. C. et al., "Application of a Model-Based Fault Detection System to Nuclear Plant Signals," downloaded from https://www.researchgate.net/publication/236463759; Conference Paper: May 1, 1997, 5 pages.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Yesilli et al.: "On Transfer Learning for Chatter Detection in Turning using Wavelet Packet Transform and Ensemble Empirical Mode Decomposition", CIRP Journal of Manufacturing Science and Technology, Elsevier, Amsterdam, NL, vol. 28, Dec. 30, 2019 (Dec. 30, 2019), pp. 118-135.

Lopez-Oriona, et al., Quantile-Based Fuzzy Clustering of Multivariate Time Series in the Frequency Domain; Elsevier—Fuzzy Sets and Systems 433 (2022) pp. 115-154).

Holan et al.; Time Series Clustering and Classification via Frequency Domain Methods; WIREs Computational Statistics / vol. 10, Issue 6 / e1444; pp. 1-3; first published Jul. 20, 2018.

Abebe Diro et al.; A Comprehensive Study of Anomaly Detection Schemes in IoT Networks Using Machine Learning Algorithms; pp. 1-13; 2021; downloaded from: https://doi.org/10.3390/s21248320.

Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.

Sutrisno Edwin: "Midimax Compression for Large Time-Series Data", dated Apr. 18, 2022, pp. 1-8, retrieved from the Internet at: URL:http://towardsdatascience.com/midimax-data-compression-for-large-time-series-data-daf744c89310, retrieval date Nov. 1, 2023.

(56) References Cited

OTHER PUBLICATIONS

Lkhagva B et al: "New Time Series Data Representation ESAX for Financial Applications", Data Engineering Workshops 2006, Proceedings 22nd International Conference on Atlanta GA, USA Apr. 3-7, 2006 Piscataway, NJ, USA IEEE. (6 pgs.).

Choi Kukjin et al: "Deep Learning for Anomaly Detection in Time-Series Data: Review, Analysis, and Guidelines", IEEE Access, IEEE, USA, vol. 9, Aug. 26, 2021, p.

Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Kenny Gross, Oracle Labs; MSET2 Overview: "Anomaly Detection and Prediction" Oracle Cloud Autonomous Prognostics; p. 1-58; Aug. 8, 2019.

Guo, "Implementation of 3D kiviat diagrams." (2008) Year: 2008 pp. 1-37.

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.

Wang et al., Process Fault Detection Using Time-Explicit Kiviat Diagrams:, AI CHE Journal 61.12 (2015):4277-4293).

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Patent Cooperation Treaty (PCT), International Search Report and Written Opinion issued in PCT International Application No. PCT/US2021/062380 having a date of mailing of May 24, 2022 (10 pgs).

* cited by examiner

PASSIVE INFERENCING OF SIGNAL FOLLOWING IN MULTIVARIATE ANOMALY DETECTION

BACKGROUND

Large numbers of sensors may be used to monitor the operations of a wide variety of assets, such as data centers, passenger aircraft, and oil refineries. The time series sensor data or signals from the sensors can be used in machine learning (ML) time series prognostic surveillance to detect incipient failure of the monitored asset before the failure occurs. ML time series prognostics typically operates by training a ML model to learn correlations among time series signals of a monitored system, using the trained ML model to predict "expected," "normal," or "correct" values for time series signals, and issuing alerts for deviations between observed and predicted signal behavior. This makes it possible to take corrective action in response to the alert before the cause of the anomalous signal behavior leads to failure of the monitored asset.

ML time series prognostics may be subject to an undesirable and potentially dangerous phenomenon called "Following" or "Signal Following." Following occurs when an anomaly appears in a signal under surveillance, but the trained ML model predicts values that match the observed behavior of the signal, rather than predicting values that reflect expected behavior of the signal. Thus, the ML algorithm generates predicted values that "follow" the anomaly, erroneously matching the anomalous behavior of the monitored signal. When following occurs, the difference between the ML prediction and the actual measured signal is slight and the anomaly does not generate an alarm. Following can be both costly and dangerous because following results in missed alerts for prognostic use cases. Missed alerts can have catastrophic consequences, such as sudden and uncontrollable failure of an asset under surveillance without an advance alert from an ML prognostic monitoring system. The following phenomenon can arise with any type of ML algorithm under certain conditions described herein.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
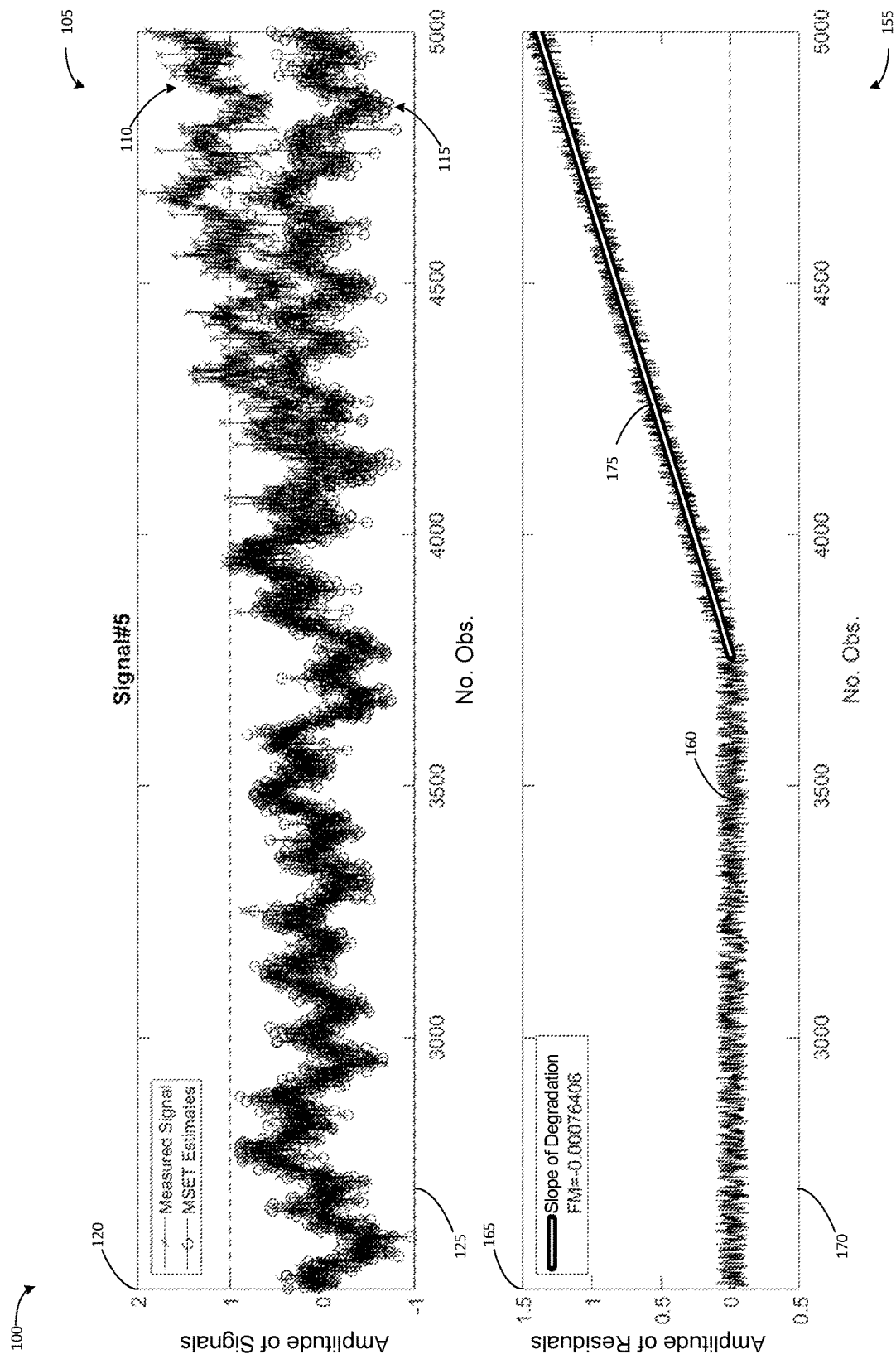
FIG. 1 illustrates a plot of a monitored signal compared with ML model estimates that exhibits very little following.

Systems and methods are described herein for passive inferencing of signal following in multivariate anomaly detection.

The undesirable phenomenon referred to as "following" or "signal following" can adversely affect the ability to detect anomalies in all types of non-linear non-parametric (NLNP) regression algorithms used for multivariate anomaly detection, including neural networks (NNs), Support Vector Machines (SVMs), autoassociative kernel regression (AAKR), and similarity-based modeling (SBM) such as the multivariate state estimation technique (MSET) (including Oracle's proprietary Multivariate State Estimation Technique (MSET2)) (altogether, "ML Anomaly Detection" algorithms). Following is an issue for any time series anomaly detection ML. This has been verified for all of the major Regression Based time series anomaly detection algorithms enumerated above. The term "following" originates from the observation that due to a complex interplay of signal dependencies, particularly in smaller ML models with poor signal-to-noise ratios, the ML estimates will "follow" the degradation in a signal, erroneously predicting values that partially or wholly mimic the degradation. Anomalies in time-series prognostic applications are ordinarily discovered when a real (that is, an observed) signal deviates from the model estimates. Where the following phenomenon causes model estimates to track the real measured signal, no degradation is detected, which can be dangerous in safety-critical industries, and costly in industries for which undetected anomalies can lead to catastrophic failures.

Generally, the propensity for following is a consequence of one or more of (i) having too few signals in the ML model, (ii) having too large of a measurement-noise content superimposed on the deterministic structure of the signals, or (iii) having too little correlation between the monitored signals. This has been demonstrated empirically. Accordingly, when the presence of following phenomena is detected in a model by implementing the systems and methods herein, the systems and methods may further assist the user to take steps to change the model by (i) adding more signals into the model, (ii) reducing noise levels (for example by implementing smoothing filters), and/or (iii) adding more correlated signals into the model, checking the model after a change to determine if the change to the model reduces following, and again checking the model for following in final model validation to show that the following has been eliminated.

Original Following Metric as a Benchmark for Inferential Following Metric

An original technique of following characterization for analyzing a ML anomaly detection algorithm to determine the degree of following that a ML model is susceptible to was developed as an initial solution to the problem of following. This original following characterization technique is described in additional detail in U.S. patent application Ser. No. 17/086,855 filed Nov. 2, 2020, titled "Characterizing Susceptibility of a Machine-Learning Model to Follow Signal Degradation and Evaluating Possible Mitigation Strategies," by inventors Zexi CHEN, Kenny GROSS, Ashin GEORGE, and Guang WANG, the entirety of which application is incorporated by reference herein in its entirety. The original following characterization technique is a valuable tool for validating new ML anomaly detection models for assurance of the absence of following. The original following characterization technique works extremely well ML anomaly detection models for assets having hundreds of sensors and sampling intervals of seconds to minutes. The original following characterization technique evaluates a model for the presence of following, and quantitatively characterizes the degree of following in the model with a following metric (FM). Where an ML model is discovered to possess some degree of following, the original following characterization technique may further help guide mitigation steps to eliminate following in the model before the model is used for predictive maintenance with real assets.

In the context of the systems and methods for passive inferencing of signal following in multivariate anomaly detection described herein, the following metric (FM) produced by the original following characterization technique may be referenced and used as a benchmark to illustrate the robustness and the improvements realized by the inferential following metric (iFM) shown and described herein. Accordingly, this section presents a primer on using the following metric to identify and quantitatively characterize the following phenomena.

At a high level, the original following characterization technique involves training an ML model on a dataset of time series signals with no anomalies in it, then recursively running the ML model by inserting a simple ramp-shaped fault signature into each signal, one signal at a time, and finding a following metric for the ML model for that signal. The following metric (FM) that quantitatively characterizes (between 0 and 1) the degree of following in the ML model for a given time series signal in the original following characterization technique is given by $$FM = 1 - \left[\frac{m_{residuals}}{m_{ramp}}\right] \qquad \text{Eq. 1}$$

where $m_{residuals}$ is the slope of the residuals between the ML model-predicted signal and the monitored signal with the inserted fault signature, and $m_{ramp}$ is the slope of the inserted ramp-shaped fault signature. Residuals are the point-by-point difference between the monitored signal data at a point (or observation) in time and the ML model estimate for that point. A low ratio of residual slope to ramp slope indicates that the ML model is following the inserted signal degradation, and a correspondingly high (nearer 1) following metric is determined for the ML model's performance regarding that signal. This process takes one complete run of the ML algorithm (through both training and surveillance phases) for each signal in the dataset.

Note that while other more complex degradation modes may be inserted into the monitored signal, there is no loss of generality in using a simple ramp degradation mode. An ML model that has the propensity for following the degradation will do so for any injected fault signature. However, a ramp degradation mode is conveniently linear and therefore readily used to generate the simple FM according to the formula above.

FIG. 1 illustrates a plot 100 of a monitored (or measured) signal (example signal #5) compared with ML model estimates (or predictions) that exhibits very little following. Plot 100 includes two subplots: (i) at the top, a signal amplitude subplot 105 that shows amplitude values of the monitored signal 110 and estimated signal 115 over time plotted against an amplitude axis 120 and an observations axis 125; and (ii) at the bottom, a residual amplitude subplot 155 of residuals 160 between the monitored signal 110 and ML model estimates 115 over time plotted against an amplitude axis 165 and an observations axis 170, with a slope 175 of a ramp degradation mode inserted into monitored signal 110 superimposed over residuals 160. Ramp degradation mode is inserted into monitored signal 110 between observations 3750 and 5000. Plot 100 portrays ML model estimates that do not contain following. It clear that there is degradation in the measured signal 110 as illustrated in signal amplitude subplot 105. As seen in the residual amplitude subplot 155, the residuals 160 align with the slope of the degradation 175. As the slope of the residuals 160 trend towards (or align with) the slope of the degradation 175, the Following Metric approaches zero, which indicates ML model estimates that do not exhibit Following.

Figure 2:
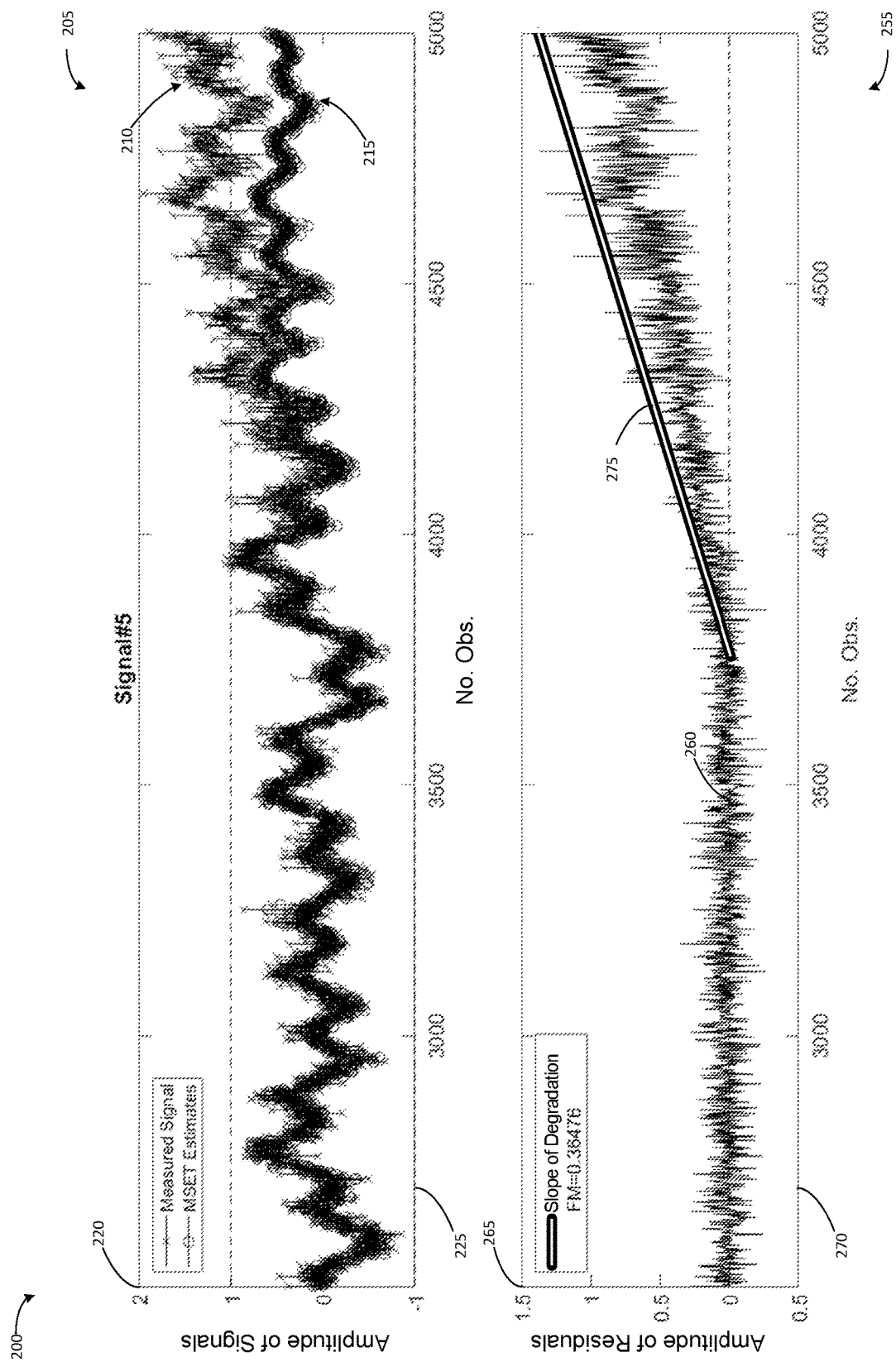
FIG. 2 illustrates a plot of a monitored signal and compared with ML model predictions that exhibit a small amount of following.

FIG. 2 illustrates a plot 200 of a monitored (or measured) signal (example signal #5) compared with ML model estimates (or predictions) that exhibits a small amount of following. Plot 200 includes two subplots: (i) at the top, a signal amplitude subplot 205 that shows amplitude values of the monitored signal 210 and estimated signal 215 over time plotted against an amplitude axis 220 and an observations axis 225; and (ii) at the bottom, a residual amplitude subplot 255 of residuals 260 between the monitored signal 210 and ML model estimates 215 over time plotted against an amplitude axis 265 and an observations axis 270, with a slope 275 of a ramp degradation mode inserted into monitored signal 110 superimposed over residuals 160. Ramp degradation mode is inserted into monitored signal 210 between observations 3750 and 5000. Plot 200 portrays ML model estimates that contain some following. The degradation in the measured signal 210 is clear in signal amplitude subplot 205, but the following may not be immediately apparent in the estimated signal 215. But, as seen in the residual amplitude subplot 255, the slope of residuals 260 do not align with slope 275 of the inserted degradation mode, indicating ML model estimates that exhibit following.

Figure 3:
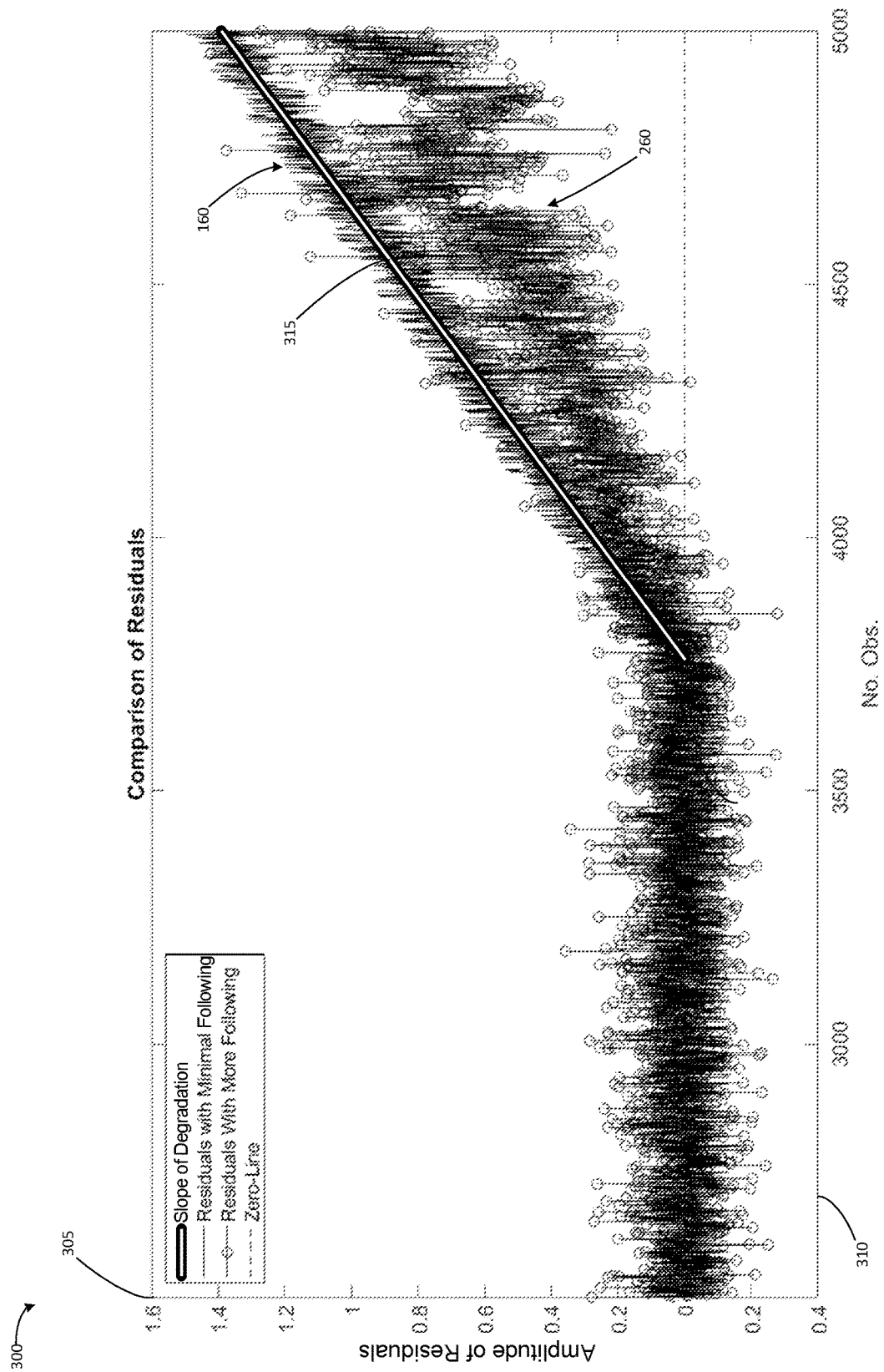
FIG. 3 illustrates a comparison plot of the two sets of residuals for the monitored signal of FIG. 1 and the monitored signal of FIG. 2.

FIG. 3 illustrates a comparison plot 300 of the two sets of residuals, residuals 160 for the monitored signal 110 of FIG. 1 and residuals 260 for the monitored signal 210 of FIG. 2. Residuals 160 and residuals 260 are both plotted against an amplitude axis 305 and an observation axis 310, with as slope 315 of a ramp degradation mode inserted into both signals 110 and 210 superimposed over the residuals 160 and 260. While residuals 110 (shown with a plain line) display very little following, residuals 210 (shown with a circled line) display some following, as seen by their deviation from the line of slope 315. Plot 300 shows the two sets of residuals 160 and 260 in the same plot for comparison, further illustrating the deviation that ML estimates suffer from when the following phenomenon is present in an ML model.

Challenges Overcome by New Inferential Following Metric

Currently, Internet of things (IoT) digital transformation initiatives are driving cross-industry adoption of denser monitoring, for which the original solution may require unfeasibly large processing and/or memory requirements to detect following. It is not uncommon for business entities (especially in the utilities and oil & gas sectors) to have data historian signal databases that have been archiving telemetry from IoT sensors for over ten years. Moreover, entities across every imaginable sector are upgrading their sensors and data acquisition systems and attaining much higher sampling rates than in previous years Both of these phenomena lead to very long sensor streams comprising hundreds of thousands, millions, or even billions of observations. For example, modern airplanes now have seventy-five thousand sensors, while modern oil refineries and medium sized data centers can each have one million sensors. At the same time, data acquisition (DAQ) units—instruments that convert measurements of physical phenomena into digital values—are typically capable of delivering sampling rates of tens of milliseconds down to single millisecond sampling intervals (that is, kHz level sampling rates).

The original following characterization technique is subject to some scalability limitations that restrict its application. While the original following characterization (or following metric) solution is excellent for monitored systems with sparser monitoring characterized by dozens to hundreds of sensors sampled at intervals of seconds to minutes, the recursive execution for N sensors is not readily scalable to denser monitoring characterized by very large values of N and/or high numbers of observations per sensor due to the orders of magnitude greater processing and memory requirements. This presents an intractable computational challenge for an ever-expanding group of business entities whose data historian(s)—software programs that records or archives data from ongoing processes—have collected signal data from very high sampling rate sensors and/or have many years of archived signal data. This data can be used for training new ML models only if computational challenges inherent to the volume of data are solved. Modern high-performance computing (HPC) and cloud computing offerings "choke" on (that is, are unable to complete) training of ML models on signal archives with 100s of Millions to Billions of observations. This is so because (i) the memory footprint required for training the ML model increases with the square of the number of sensors under surveillance, and (ii) in order to maintain a uniform density of training vectors, the compute cost increases with the cubic power of the number of observations in the historical dataset used for training the machine learning model. In the original following characterization process, such training of ML models needs to be repeated for each signal in the signal database. Thus, the original following characterization tool is limited by the memory footprint and overall compute cost to confirm the absence of following in a model, and cannot be used for IoT customers with hundreds of Millions to Billions of observations in their Data Historian signal archives.

There are also some other limitations on the original following characterization technique and its fitness metric output. First, artificially inserting degradation onto a signal inherently alters the signal trend which, if degradation already exists in the signal, will inflate the FM value. Second, the original following metric does not lend itself to differentiating the severity of following in cases where high degrees of following occur. Third, the original following characterization technique assesses how an ML model makes estimates when anomalous trends are present, but does not address a major driver of following: noise. When an ML algorithm is deployed, one important goal/feature is to learn the underlying behavior of the monitored system. Time series forecasting and anomaly detection ML in particular will begin to learn the critical modes of a system, but as more measurement noise is introduced, mode primacy becomes more opaque and the algorithm will start to learn or follow the noise modes in addition to the nominal behavior. Further, in some applications of anomaly detection, many monitored signals may be "range bound", which means that for certain mechanical, electromechanical, and even hydraulic flow systems, the control variable duty cycle can only go between zero (idle) and max (100%). For such range bound variables, it is physically meaningless to superimpose a ramp that goes above 100% duty cycle max setting.

The systems and methods described herein overcome the sensor quantity and sampling rate challenges by implementing an approach—passive inferencing of signal following in multivariate anomaly detection—that does not require multiple training/execution iterations for evaluating following and quantitatively characterizing the degree of following. Instead, the new passive inferencing of following approach takes just one execution of the ML algorithm. By running the ML algorithm just once and with no anomalies in the customer dataset, the degree of following for the resulting ML model may be inferred from the computed standard deviation of the residuals (residuals are the pairwise differences between the measured signals and the ML model estimates of the signals) that are generated from one single run of the ML. This standard deviation of the residuals between the measured signals and the ML model estimates functions as an inferential following metric (iFM) as described herein.

Advantageously, the systems and methods for passive inferencing of following in multivariate anomaly detection described herein readily scales to current and future dense monitoring use cases involving hundreds of millions to billions of observations without the unsupportable compute cost of the original solution. In another advantage, implementation of the systems and methods for passive inferencing of following in multivariate anomaly detection for existing ML surveillance systems makes the existing ML surveillance systems more accurate, reducing false-alarm rates for ML prognostic anomaly discovery for IoT end customers.

Also, the systems and methods for passive inferencing of following in multivariate anomaly detection described herein not only resolves the issue of FM inflation due to the presence of undetected following in a signal, but is also capable of quantifying following from both degradation and noise, leading to a more robust and general metric.

Further, the systems and methods for passive inferencing of following in multivariate anomaly detection described herein avoid the concern of inserted ramps exceeding meaningful values on range bound signals by eliminating the need for inserting ramps or other synthetic degradation signatures into the signal.

Example Environment

Figure 4:
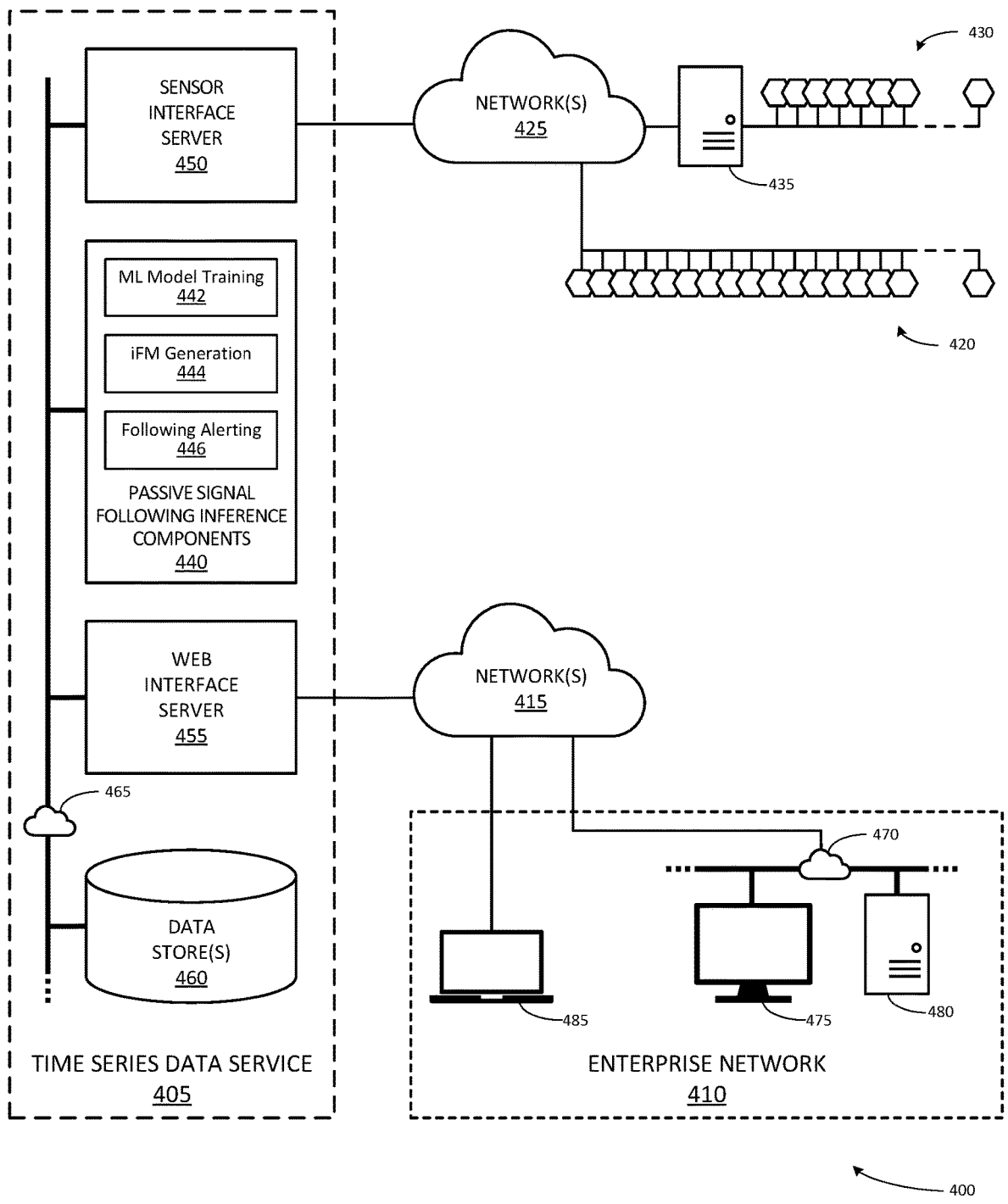
FIG. 4 illustrates one embodiment of a system associated with passive inferencing of signal following in multivariate anomaly detection.

FIG. 4 illustrates one embodiment of a system 400 associated with passive inferencing of signal following in multivariate anomaly detection.

In one embodiment, the system 400 includes a time series data service 405 and an enterprise network 410 connected by a network 415 such as the Internet and private networks connected to the Internet. The time series data service 405 is connected either directly to sensors (such as sensors 420) or data acquisition units (DAQs) such as remote terminal units (RTUs) through a network 425 or indirectly to sensors (such as sensors 430) or DAQs through one or one or more upstream devices 435. In one embodiment, networks 415 and 425 are the same network, and in another embodiment, networks 415 and 425 are separate networks.

In one embodiment, time series data service 405 includes various systems such as passive signal following inference components 440, a sensor interface server 450, a web interface server 455, and data store 460. Each of these systems 440, 450, 455, 460 are configured with logic, for example by various software modules, for executing the functions they are described as performing. In one embodiment, the components of time series data service 405 are implemented on one or more hardware computing devices or hosts interconnected by a data network or cloud network (such as server-side network 465). For example, the components of time series data service 405 may be executed by network-connected computing devices of one or more compute hardware shapes, such as standard (or general purpose) central processing unit (CPU) shapes, dense input/output (I/O) shapes, graphics processing unit (GPU) shapes, and HPC shapes. In one embodiment, the components of time series data service 405 are each implemented by dedicated computing devices. In one embodiment, several or all components of time series data service 405 are implemented by a common (or shared) computing device, even though represented as discrete units in FIG. 4. In one embodiment, components of time series data service 405 may be implemented across multiple computing devices.

In one embodiment, passive signal following inference components 440 include an ML model training component 442, an iFM generation component 444, and a following alerting component 446. In one embodiment, each of these components are implemented as a software module. In one embodiment, ML model training component 442 is configured to train and generate a machine learning model to predict or estimate correct or expected signal values from training data representing ordinary, correct operation of a system, for example as described in further detail herein. In one embodiment, iFM generation component 444 is configured to infer an extent of following in an ML model (by generating an iFM) based on the standard deviations of sets of actual values in a time-series signal and the standard deviations of sets of residuals between estimated and actual values of the time-series signal, for example as shown and described in further detail herein. In one embodiment, following alerting component 446 is configured to launch various forms of alerts when unacceptably high levels of following are indicated by the iFM, for example as described in further detail herein.

In one embodiment, the components of time series data service 405 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/Internet protocol (TCP/IP) or other computer networking protocol. Each component of time series data service 405 may (i) generate or compose an electronic message or signal to issue a command or request to another component, (ii) transmit the message or signal to other components using the infrastructure of scheduling, dispatch, and routing system 405 and (iii) parse the content of an electronic message or signal received to identify commands or requests that the component can perform, and in response to identifying the command, the component will automatically perform the command or request.

In one embodiment, time series data service 405 may be implemented as a service on cloud infrastructure. In one embodiment, time series data service 405 may be hosted by a dedicated third party, for example in an infrastructure-as-a-service (IAAS), platform-as-a-service (PAAS), or software-as-a-service (SAAS) architecture. In one embodiment, time series data service 405 may be implemented on on-premises infrastructure, such as a set of one or more dedicated servers.

In one embodiment, time series data service 405 may be hosted by a third party, and/or operated by a third party for the benefit of multiple account owners/tenants, each of whom is operating a business, and each of whom has an associated enterprise network 410. In one embodiment, either of time-series service 405 and enterprise network 410 may be associated with business entities operating in any of a variety of dense-sensor (that is, using a high number of sensors) IoT industries (such as Oil & Gas production, Utilities, Aviation, home appliances, and data center IT). In one embodiment, time series data service 405 is configured with logic, such as software modules, to operate the time series data service 405 to prognostically detect or discover anomalous operation in assets with random downtimes in accordance with the systems and methods described herein.

In one embodiment, sensors or DAQs 420, 430 are configured to monitor physical phenomena occurring in or around an asset (such as a machine, device, system, or facility) In one embodiment, sensors or DAQs 420, 430 may be operably connected to assets or otherwise configured to detect and monitor physical phenomena occurring in or around the asset. The assets generally include any type of machinery or facility with components that perform measurable activities. The sensors or DAQs 420, 430 may be network-connected sensors for monitoring any type of physical phenomena. The network connection of the sensors or DAQs 420, 430 may be wired or wireless. The sensors 420, 430 may include (but are not limited to): a voltage sensor, a current sensor, a temperature sensor, a pressure sensor, a rotational speed sensor, a thermometer, a flow meter sensor, a vibration sensor, a microphone, a photosensor, an electromagnetic radiation sensor, a proximity sensor, an occupancy sensor, a motion sensor, a gyroscope, an inclinometer, an accelerometer, a global positioning system (GPS) sensor, a torque sensor, a flex sensor, a moisture monitor, a liquid level sensor, an electronic nose, a nuclear radiation detector, or any of a wide variety of other sensors or transducers for generating electrical signals that describe detected or sensed physical behavior.

In one embodiment, the sensors 420, 430 are connected through network 425 to sensor interface server 450. In one embodiment, sensor interface server 450 is configured with logic, such as software modules, to collect readings from sensors 420, 430 and store them as observations in a time series data structure, for example in data store 460. In one embodiment, sensor interface server 450 includes a data historian module for creating and interacting with time series data structures (such as time series data archives) in data store 460. The sensor interface server 450 is configured to interact with the sensors, for example by exposing one or more application programming interfaces (APIs) configured to accept readings from sensors using sensor data formats and communication protocols applicable to the various sensors 420, 430. The sensor data format will generally be dictated by the sensor device. The communication protocol may be a custom protocol (such as a legacy protocol predating IoT implementation) or any of a variety of IoT or machine to machine (M2M) protocols such as Constrained Application Protocol (CoAP), Data Distribution Service (DDS), Devices Profile for Web Services (DPWS), Hypertext Transport Protocol/Representational State Transfer (HTTP/REST), Message Queuing Telemetry Transport (MQTT), Universal Plug and Play (UPnP), Extensible Messaging and Presence Protocol (XMPP), ZeroMQ, and other communications protocols that can be carried by the transmission control protocol—internet protocol or user datagram protocol (TCP/IP or UDP) transport protocols. SCADA protocols such as OLE for Process Control Unified Architecture (OPC UA), Modbus RTU, RP-570, Profibus, Conitel, IEC 60870-5-101 or 104, IEC 61850, and DNP3 may also be employed when extended to operate over TCP/IP or UDP. In one embodiment, the sensor interface server 450 polls sensors 420, 430 to retrieve sensor readings. In one embodiment, the sensor interface server passively receives sensor readings actively transmitted by sensors 420, 430.

For simplicity and clarity of explanation, the enterprise network 410 is represented by an on-site local area network 470 to which one or more personal computers 475, or servers 480 are operably connected, along with one or more remote user computers 485 that are connected to the enterprise network 410 through the network 415 or other suitable communications network or combination of networks. The personal computers 475 and remote user computers 485 can be, for example, a desktop computer, laptop computer, tablet computer, smartphone, or other device having the ability to connect to local area network 470 or network 415 or having other synchronization capabilities. The computers of the enterprise network 410 interface with time series data service 405 across the network 415 or another suitable communications network or combination of networks.

In one embodiment, remote computing systems (such as those of enterprise network 410) may access information or applications provided by the time series data service 405 through web interface server 455. For example, computers 475, 480, 485 of the enterprise network 410 may access passive signal following inference components 440 from time series data series data service 405. In one embodiment, the remote computing system may send requests to and receive responses from web interface server 455. In one example, access to the information or applications may be effected through use of a web browser on a personal computer 475 or remote user computers 485. For example, these computing devices 475, 480, 485 of the enterprise network 410 may request and receive a web-page-based graphical user interface (GUI) for accessing monitoring and alert information provided by passive signal following inference components 440. In one example, these communications may be exchanged between web interface server 455 and server 480, and may take the form of remote representational state transfer (REST) requests using JavaScript object notation (JSON) as the data interchange format for example, or simple object access protocol (SOAP) requests to and from XML servers.

In one embodiment, data store 460 includes one or more databases (such as data historian archives, time-series databases, or signal databases) or other data structures configured to store and serve time series data received by sensor interface server 450 from sensors 420, 430. The time series data may consist of values sensed by one or more sensors at regular or irregular intervals and stored in association with both the sensor and the time the value was sensed. In one embodiment, the time-series database is an Oracle® database configured to store and serve time-series data. In some example configurations, data store(s) 460 may be implemented using one or more Oracle® Exadata compute shapes, network-attached storage (NAS) devices and/or other dedicated server device. API calls may include queries against databases. The queries may be composed in SQL and executed in a SQL runtime, or use other appropriate query languages and environments.

In one embodiment, upstream device 435 may be a third-party service for managing IoT connected devices. Or, in one embodiment, upstream device 435 may be a gateway device configured to enable sensors 430 to communicate with sensor interface server 450 (for example, where sensors 430 are not IoT-enabled, and therefore unable to communicate directly with sensor interface server 450).

Quantitatively Characterizing Following with Inferential Following Metric

The systems and methods for passive inferencing of following in multivariate anomaly detection described herein present a radically different approach to characterization of following in all types of ML Anomaly Detection algorithms referred to as the inferential following metric (iFM).

The process for characterizing following using the iFM does not require introduction of any degradation signatures into any of the monitored signals to induce-then-characterize following as in the original following characterization technique. Instead, the new iFM is a systematic pattern recognition implementation that infers the presence of following in an ML model through analysis of the measurement noise that is already on the monitored signals. For all measured IoT signals where the signals originate from physical transducers, there is necessarily some measurement noise. Such signals are generally expressed as quantitative variables. (Note that for categorical variables—that is, status variables such as on/off, open/closed, engaged/disengaged, or other variables that can take on one of a fixed number of possible discrete states—there is no noise, but there also is no possibility of following in the signals for that variable.) Whether the noise level is small for high-accuracy signals monitoring very stable processes, or the noise level is large either due to poor sensor accuracy (large uncertainties) and/or noisy physics processes being monitored, the new iFM technique produces a highly-accurate inference of the following metric, as shown herein.

The new iFM is a computational technique to identify how much following is occurring in an ML model without inducing degradation into each signal sequentially as in the original following characterization technique. iFM is predicated on the idea that if an ML model is performing correctly, nominal behavior will be learned during ML training, and then later during surveillance, anomalous degradation signatures will be detected.

Therefore, for an ML model that exhibits no following, the standard deviation (STD or σ) of the residuals resulting from monitoring the signals should correlate with the standard deviation of the signals themselves.

All measured signals possess a deterministic component with some superimposed random measurement noise. No ML algorithm can predict randomness, including random measurement noise. ML algorithm prediction of random measurement noise is an indication of following by the ML algorithm. Therefore, as mentioned above, when the ML model is behaving very well and with no following, the noise on the residuals should correlate to the noise on the incoming raw measured signals. But, if the standard deviation of the Residuals is seen to become smaller, diminish, or otherwise "shrink" compared to the noise on the original measured signals, that is an indication of following. Such shrinking residuals mean that the ML model is following the randomness. The presence of shrinking residuals can be shown where the standard deviation of the residuals is smaller than the standard deviation of the measured signals being analyzed. Moreover, the greater the degree of following by the ML model, the greater the reduction in random noise in the residuals. This characteristic in the behavior of signals being transformed by nonlinear nonparametric (NLNP) regression can be leveraged for a robust, high-fidelity characterization of following for any NLNP regression-based anomaly detection service. This means that instead of directly computing following by inducing anomalies in every signal under surveillance and recursively evaluating the ML N times for N signals, as in the original following characterization technique, the degree of following in the ML model can be inferred by running the ML model once on anomaly free data, computing the residuals, computing the standard deviation (STD) of the residuals, compiling the list of ratios of the STD of the raw signals to the corresponding STDs of the residuals, and integrating over the database of signals to get a quantitative index—the iFM—for the propensity of the model to exhibit following. Thus, in one embodiment, the training of the ML model and predicting of values occurs only once when inferencing signal following in the machine learning model.

There is a 1-to-1 mapping between the new iFM index and the degree of following for the ML model, but this mapping is correct only within the same database of signals. Note that every database of time series signals possesses different signal-to-noise ratios (SNRs), different degrees of intra-signal correlation patterns, and different sampling rates. Due to the nonlinear complexities in the intra-signal correlation patterns, it is not mathematically tractable to derive some analytical formula to predict following for any database of time series signals, nor to compile a lookup-table approach for following based on a single completion of the run model—compute residuals—compute standard deviations—integrate steps outlined above.

The new iFM tracks the ratio of the original raw signal STD to the computed residual STD, which is computed for each signal in the database. Advantageously, the ML model only needs to be run once when characterizing following with the iFM, as opposed to the original following characterization technique that used recursive execution of the ML model N times for N signals. After computing a table of ratios of the raw signal STD to the computed residual STD for each signal, these values are averaged over the entire database to account for any outlier behavior and give a holistic representation of the following effect.

Example Methods for Inferential Characterization of Following

In one embodiment, each step of computer-implemented methods described herein may be performed by a processor (such as processor 910 as shown and described with reference to FIG. 9) of one or more computing devices (i) accessing memory (such as memory 915 and/or other computing device components shown and described with reference to FIG. 9) and (ii) configured with logic to cause the system to execute the step of the method (such as passive inferencing of signal following in multivariate anomaly detection logic 930 shown and described with reference to FIG. 9). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 915, or storage/disks 935 of computing device 905 or remote computers 965 shown and described with reference to FIG. 9, or in data stores 460 shown and described with reference to FIG. 4).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 5:
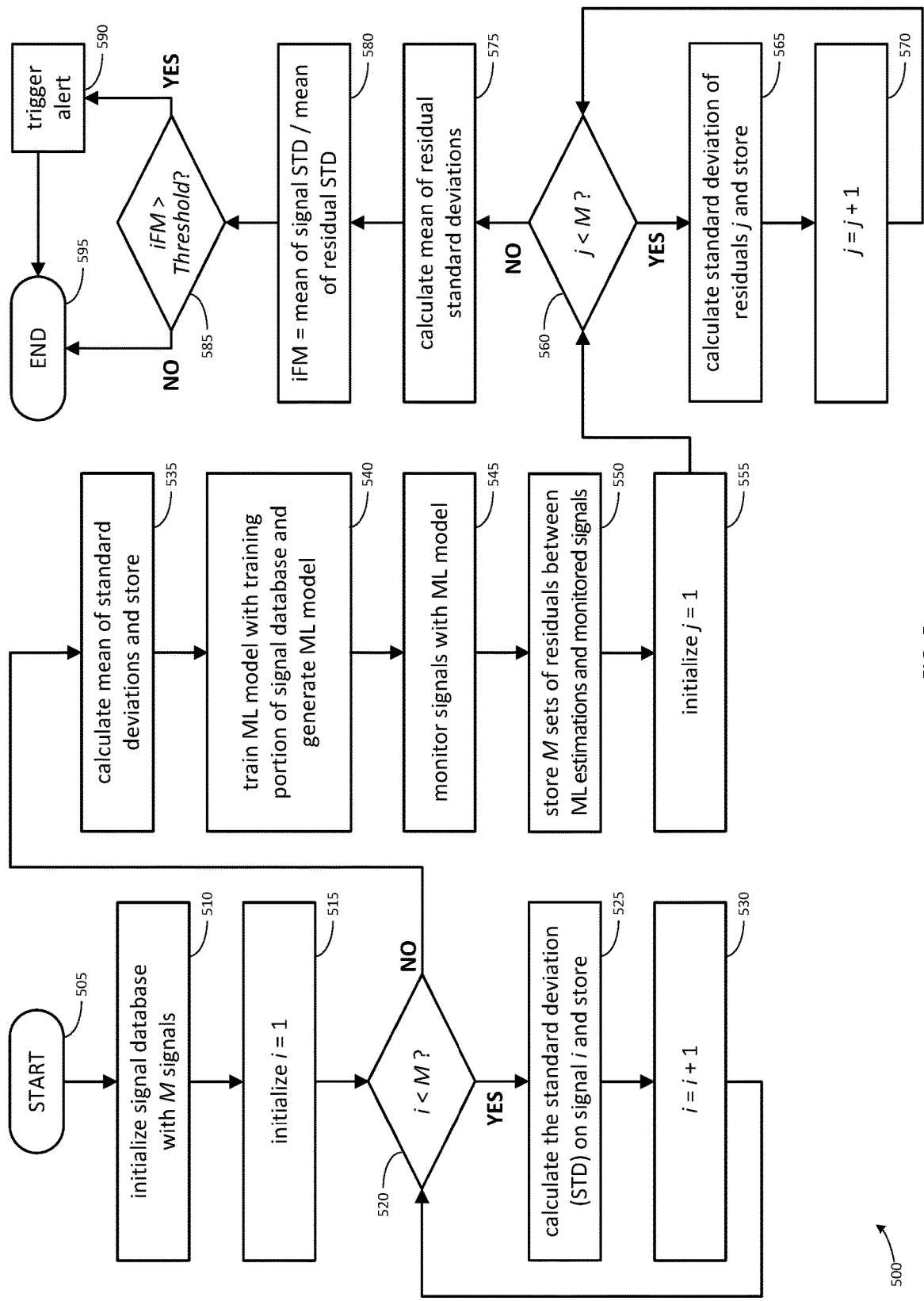
FIG. 5 illustrates one embodiment of a method associated with passive inferencing of signal following in multivariate anomaly detection.

FIG. 5 illustrates one embodiment of a method 500 associated with passive inferencing of signal following in multivariate anomaly detection. Method 500 shows one embodiment of a process for calculating and tracking the iFM for any database of time series signals in a detailed flow chart.

In one embodiment, the steps of method 500 are performed by passive signal inferencing components 440 (as shown and described with reference to FIG. 4). In one embodiment, passive signal inferencing components 440 is a special purpose computing device (such as computing device 905) configured with passive inferencing of signal following in multivariate anomaly detection logic 930. In one embodiment, passive signal inferencing components 440 are one or more modules of a special purpose computing device configured with logic 930.

The method 500 may be initiated automatically based on various triggers, such as in response to receiving a signal over a network or parsing stored data indicating that (i) a user (or administrator) of time series data service 405 has initiated method 500, (ii) that method 500 is scheduled to be initiated at defined times or time intervals, or (iii) that a user (or administrator) of time series data service 405 has executed a command to train an ML model on a signal database. The method 500 initiates at START block 505 in response to parsing a signal received or stored data retrieved and determining that the signal or stored data indicates that the method 500 should begin. Processing continues to process block 510.

At process block 510, the processor initializes a signal database with M time series signals. In one embodiment, the processor accepts parameters describing the signal database, including the number of signals M, a number of observations or length of the signal database O, and generates a database of M synthetic signals of length O. For example, the parameters may be entered by a user through a graphical user interface (GUI) of a high-fidelity signal synthesizer, and the signal synthesizer generates simulations of signals produced by sensors of a monitored system during ordinary, non-anomalous operation. The database of synthetic signals may be stored, for example, in data store 460. In one embodiment, the processor accepts a selection of a particular signal database having M signals that is stored, for example, in data store 460, and makes it ready for access for example, by retrieving the signal database (in whole or in part) from storage in data store 460 and holding it in memory. In one embodiment, the signal database having M signals may be a database of synthetic signals generated and stored prior to the selection. In one embodiment, the signal database having M signals may be a database of actual signals recorded from sensors such as sensors 420, 430 and stored prior to the selection. Once the processor has thus completed initializing a signal database with M signals, processing at process block 510 completes, and processing continues to process block 515.

At process block 515, the processor initializes a signal counter i to a value of 1. The signal counter i is an index number that indicates which signal of the database (in a range from signal no. 1 to signal no. M) is current signal under consideration in a processing loop shown and described with reference to blocks 520, 525, and 530 below. In one embodiment, the processor declares an integer variable i for the signal counter, and executes an assignment operation to give i the integer value of 1. Once the processor has completed initializing signal counter i to a value of 1, processing at process block 515 completes, and processing continues to decision block 520.

Blocks 520, 525, and 530 form a processing loop that repeats for each of the M signals in the signal database. The processing loop is shown and described with reference to FIG. 5 as a while loop, with a prior condition expressed at decision block 520. Alternatively, the processing loop might also be implemented as a do-while loop with a post condition expressed following the loop. At decision block 520, the processor determines whether signals remain for evaluation (at block 525) in the signal database. In one embodiment, the processor makes this determination by evaluating whether the value of signal counter i is less than or equal to the number of signals in the database M. The processor retrieves the value of the number of signals in the database M and the current value of signal counter i. The processor compares the values of M and i. Where the value of i is less than or equal to M, signals remain for evaluation in the signal database. Where the value of i is not less than or equal to (that is, greater than) M, no signals remain for evaluation in the database. Where the processor has thus determined that signals remain in the signal database (i≤M?:YES), processing at decision block 520 completes, and processing continues to process block 525. Where the processor has determined that no signals remain in the signal database (i≤M?: NO), processing at decision block 520 completes, the loop of blocks 520, 525, and 530 terminates, and processing continues to process block 535.

At process block 525, the processor calculates the standard deviation for signal no. i, and stores it. In one embodiment, the processor calculates the standard deviation for signal no. i by (i) retrieving the amplitude value of signal no. i at each observation of signal no. i (amplitude$_{obs}$) from the signal database, for example by parsing signal no. i to extract the amplitude value at each observation between 1 and the total number of observations in signal no. i, inclusive; (ii) calculating the mean amplitude of signal no. i (signalMean) from all the retrieved amplitudes and the total number of observations in signal no. i (numObs), for example by solving an equation as shown in Eq. 2:

$$signalMean = \frac{\sum_{obs=1}^{numObs} amplitude_{obs}}{numObs} \quad \text{Eq. 2}$$

(iii) calculating the variance of signal no. i (signalVariance) from the mean amplitude of signal no. i, all the retrieved amplitudes, and the total number of observations in signal no. i for example for example by solving an equation as shown in Eq. 3:

$$signalVariance = \frac{\sum_{obs=1}^{numObs} (amplitude_{obs} - signalMean)^2}{numObs} \quad \text{Eq. 3}$$

and (iv) calculating the standard deviation of signal no. i (signalSTD) from the variance of signal no. i, for example for example by solving an equation as shown in Eq. 4:

$$signalSTD = \sqrt{signalVariance} \quad \text{Eq. 4}$$

At each of the steps above, the processor may store the results (amplitudes, mean, variance, and standard deviation) for further processing by writing the result as a data structure in memory or storage. For example, the mean, variance, and standard deviation of the signal may be stored in a data structure associated with signal no. i, such as in metadata fields of the data structure for the signal in in the signal database. Once the processor has thus completed calculating the standard deviation for signal no. i, and storing it, processing at process block 525 completes, and processing continues to process block 530.

At process block 530, the processor increments the value of the signal counter i by one. In one embodiment, the value of i is retrieved, the sum of the value of i and one is found, and the value of that sum is stored as the value of i. This advances the loop to the next signal under consideration. Once the processor has thus completed incrementing the value of the signal counter i by one, processing at process block 530 completes, and processing returns to decision block 520.

Following completion of the loop of block 520, 525, and 530, processing proceeds to process block 535. At process block 535, the processor calculates the mean of the standard deviations for all M signals and stores it. In one embodiment, the processor calculates the mean of the standard deviation for all M signals by (i) retrieving the standard deviation for each of the M signals from the data structure associated with each signal, for example by parsing the data structure of each of the M signals to locate the standard deviation of the signal and extract it; and (ii) calculating the mean standard deviation of the M signals (signalSTDMean) from all the extracted standard deviations, for example by solving an equation as shown in Eq. 5:

$$signalSTDMean = \frac{\sum_{m=1}^{M} signalSTD_m}{M} \quad \text{Eq. 5}$$

The processor may store the calculated mean of the standard deviation for all M signals for further processing by writing the result as a data structure in memory or storage. For example, the mean of the standard deviation for all M signals may be stored in a data structure associated with the signal database, such as in a metadata field of the signal database. At this point, the processor has calculated one average standard deviation of measured values of the M time series signals. Once the processor has thus completed calculating the mean of the standard deviations for all M signals and storing it, processing at process block 535 completes, and processing continues to process block 540.

At process block 540, the processor trains a machine learning model with a training portion of the signal database and generates the machine learning model.

In one embodiment, the processor implements a supervised learning process to build a state estimation model of each signal in a set of signals selected from the signal database of M signals. In one embodiment, where M is smaller, all M signals in the signal database may be selected for inclusion in the state estimation model. In one embodiment, where M is larger, a sampling of the signals in the signal database may be selected for inclusion in the state estimation model. The processor selects a set of training data—signal data over a time/observation interval that represents a normal operating state of the system represented by the signals in the signal database. For example, this may be a first or initial portion of the signals in the signal database that is confirmed to represent normal operation. In one embodiment, the ML state estimation model is an MSET or MSET2 model. In one embodiment, the ML state estimation model implements an ML Anomaly Detection algorithm other than MSET or MSET2. In one embodiment, the ML state estimation model is a non-linear non-parametric regression model. For each signal in the set of signals, the state estimation model is trained with the training data to generate an accurate estimate for the signal based on the values and correlations among the other signals in the set. The processor then stores the state estimation model, thereby generating the state estimation model. In this way, the processor has trained the machine learning model to predict or estimate values of the time series signals.

In one embodiment, the processor configures a fault detection model to identify anomalous deviations between a measured signal and an estimated value for that signal. In one embodiment, the fault detection model uses the sequential probability ratio test (SPRT), which detects anomalous deviations from normal operation (or faults) by calculating a cumulative sum of the log-likelihood ratio for each successive residual between the measured signals and estimated values. The processor selects a threshold value of the cumulative sum of the log likelihood ratio of at which to accept the null hypothesis—no fault is detected—for the SPRT. The processor also selects a threshold value the cumulative sum of the log likelihood ratio at which to accept the alternative hypothesis—fault is detected—for the SPRT. The processor then stores the configured fault detection model in association with the state estimation model thereby generating the fault detection model.

Once the processor has thus completed training a machine learning model with a training portion of the signal database and generating the machine learning model, processing at process block 540 completes, and processing continues to process block 545.

At process block 545, the processor monitors the signals with the ML model.

In one embodiment, the processor selects a set of surveillance data—signal data over a time/observation interval for which the trained ML model is to determine whether or not there are any anomalous deviations in the signals. For example, the surveillance data may be a second or latter portion of the signals in the signal database. In one embodiment, the signal database is divided into a training portion including all observations beginning at a first observation in the signal database up to (but not including) a selected observation (the training data), and a surveillance portion including all observations starting with the selected observation up to a final observation (or a second selected observation) in the signal database (the surveillance data). In one embodiment, the surveillance data is the remainder of the observations in the signal database other than the training data. The processor retrieves the selected observation from memory and sets it as the beginning point of the monitoring, and retrieves the final observation and sets it as the end point of the monitoring.

For each observation from the beginning point to the end point of the monitoring, the processor executes the trained ML model for the values of the signals at the observation to generate a predicted or estimated value for each of the signals at the observation. The processor stores the estimated value for each of the signals at the observation. In one embodiment, the processor repeats the prediction and storage for each observation in turn until the monitoring is completed, generating a stored set of estimated values for each signal at each observation. In this way, the processor has predicted or estimated values of each of the signals with the trained machine learning model.

Once the processor has thus completed monitoring the signals with the ML model, processing at process block 545 completes, and processing continues to process block 550.

At process block 550, the processor stores a set of residuals between the ML model estimated value and the actual value of the signal for each signal in the signals database. In one embodiment, for each signal (m) in the database of M signals of length numObs observations, for each observation (obs) of the signal, the processor retrieves the value of the signal that was estimated by the ML model (estimate$_{obs}$) for that observation and the actual measured value of the signal (measurement$_{obs}$) for that observation, and the processor calculates a residual value (residual$_{obs}$) for that observation by taking the difference between the ML model prediction and the measurement at the observation, for example as shown in Eq. 6:

$$\text{residual}_{obs} = \text{estimate}_{obs} - \text{measurement}_{obs} \qquad \text{Eq. 6}$$

Thus, a pairwise differencing operation is performed between the actual monitored values and the estimated or predicted values generated by the model to generate the residual for each observation. The processor stores the residual for each observation obs of each signal m. The set of residuals for a signal m is therefore the set of all residuals from obs=1 to obs=numObs. The processor stores the set of residuals for each signal in association with the signal m, for example by entering the residual values for each observation in a field (or other data structure) associated with the observation in a signal data structure. The signal data structure for each signal m may have fields for a measurement value, an estimate value, and a residual value at each observation, arranged in order of observation as a time series. The signal data structures may be stored in the signal database. In one embodiment, the residuals may be calculated as part of the operation of a fault detection model, such as an SPRT model as discussed above, and used both for the SPRT fault detection and for characterizing following as described herein. In this way, the processor generates a time series set of residuals between the predicted values and the measured values for each of the signals.

Once the processor has thus completed storing a set of residuals between the ML model estimated value and the actual value of the signal for each signal in the signals database, processing at process block 550 completes, and processing continues to process block 555.

At process block 555, the processor initializes a set of residuals counter j to a value of 1. As discussed above, the processor has generated a set of residuals for each signal in the database. The set counter j is an index number that indicates which set of residuals (in a range from the set of residuals for signal no. 1 to the set of residuals for signal no. M) is current set of residuals under consideration in a processing loop shown and described with reference to blocks 560, 565, and 570 below. In one embodiment, the processor declares an integer variable j for the set counter, and executes an assignment operation to give j the integer value of 1. Once the processor has completed initializing set counter j to a value of 1, processing at process block 555 completes, and processing continues to decision block 560.

Blocks 560, 565, and 570 form a processing loop that repeats for each of the M sets of residuals. The processing loop is shown and described with reference to FIG. 5 as a while loop, with a prior condition expressed at decision block 560. Alternatively, the processing loop might also be implemented as a do-while loop with a post condition expressed following the loop. At decision block 560, the processor determines whether sets of residuals remain for evaluation (at block 565) by evaluating whether the value of set counter j is less than or equal to the number of residuals M in a manner similar to that shown and described for signal counter i with reference to decision block 520 above. Where the processor has determined that sets of residuals remain (j≤M?:YES), processing at decision block 560 completes, and processing continues to process block 565. Where the processor has determined that no sets of residuals remain (j≤M?:NO), processing at decision block 560 completes, the loop of blocks 560, 565, and 570 terminates, and processing continues to process block 575.

At process block 565, the processor calculates the standard deviation for set of residuals for signal no. j (also referred to herein as set of residuals no. j), and stores it. In one embodiment, the processor calculates the standard deviation for set of residuals no. j by (i) retrieving the residual value of set of residuals no. j at each observation of signal no. j (residual_obs) from the signal database, for example by parsing signal no. j to extract the residual value at each observation between 1 and the total number of observations in signal no. j, inclusive; (ii) calculating the mean residual value of set of residuals no. j (residualMean) from all the retrieved residuals and the total number of residuals in set of residuals no. j (numObs), for example by solving an equation as shown in Eq. 7:

$$residualMean = \frac{\sum_{obs=1}^{numObs} residual_{obs}}{numObs} \qquad \text{Eq. 7}$$

(iii) calculating the variance of set of residuals no. j (residualVariance) from the mean residual of set of residuals no. j, all the retrieved residuals, and the total number of observations for example for example by solving an equation as shown in Eq. 8:

$$residualVariance = \frac{\sum_{obs=1}^{numObs} (residual_{obs} - residualMean)^2}{numObs} \qquad \text{Eq. 8}$$

and (iv) calculating the standard deviation of set of residuals no. j (residualSTD) from the variance of set of residuals no. j, for example for example by solving an equation as shown in Eq. 9:

$$residualSTD = \sqrt{residualVariance} \qquad \text{Eq. 9}$$

At each of the steps above, the processor may store the results (amplitudes, mean, variance, and standard deviation) for further processing by writing the result as a data structure in memory or storage. For example, the mean, variance, and standard deviation of the set of residuals may be stored in a data structure associated with set of residuals no. j. For example, these values may be stored as metadata of the data structure in the signal database fields for the signal no. j that are related to the set of residuals for signal no. j. Once the processor has thus completed calculating the standard deviation for set of residuals no. j, and storing it, processing at process block 565 completes, and processing continues to process block 570.

At process block 570, the processor increments the value of the set counter j by one in a manner similar to that shown and described above for signal counter i with reference to process block 530. Processing at process block 570 completes, and processing returns to decision block 560.

Following completion of the loop of block 560, 565, and 570, processing proceeds to process block 575. At process block 575, the processor calculates a mean of the residual standard deviations (that is, the mean of the standard deviations of the sets of residuals). In one embodiment, the processor retrieves each of the M standard deviations calculated for the M sets of residuals for the signals from memory or storage. The processor then calculates a sum of each of the standard deviations of the residuals, and stores the sum for subsequent processing. The processor then divides the sum by M—which is the number of signals, the number of sets of residuals for those signals, and the number of standard deviations of the sets of residuals—to find the mean of the standard deviations of the residuals. In one embodiment, the processor determines the mean of the standard deviations of the residuals (residualSTDMean) by solving Eq. 10

$$residualSTDMean = \frac{\sum_{m=1}^{M} residualSTD_m}{M} \qquad \text{Eq. 10}$$

The processor then stores the mean for subsequent processing, for example in a data structure associated with the signal database, for example, as metadata of the signal database, or in a data structure associated with the ML model. At this point, the processor has calculated an average (in this case, the mean) standard deviation of the sets of residuals. Once the processor has thus completed calculating the mean of the standard deviations of the residuals, processing at process block 575 completes, and processing continues to process block 580.

At process block 580, the processor calculates an inferential following metric (iFM) from the mean of the standard deviations of the signals (calculated and stored as described with reference to process block 535 above) and the mean of the standard deviations of the residuals. In one embodiment, the iFM is the ratio of the mean of the standard deviations of the signals to the mean of the standard deviations of the residuals, or as expressed in Eq. 11, $$iFM = \frac{signalSTDMean}{residualSTDMean} \qquad \text{Eq. 11}$$

The processor then writes the iFM to memory or storage for subsequent reference or processing, for example in metadata for the signal database, or in metadata for the ML model or other storage location associated with the ML model. In this way, the processor calculates the iFM ratio by dividing the average standard deviation of measured values by the average standard deviation of the sets of residuals. Once the processor has thus completed calculating an inferential following metric from the mean of the standard deviations of the signals and the mean of the standard deviations of the residuals, processing at process block 580 completes, and processing continues to decision block 585.

At decision block 585, the processor evaluates whether the iFM satisfies an alert threshold. In one embodiment, the alert threshold indicates a point beyond which the level of following detected or inferred in the ML model (represented by the iFM) is unacceptably high. The threshold can be previously defined by the user and stored for retrieval and use at decision block 585. In one embodiment, a model with a very low degree of following will have an iFM that is 1 or lower, and an iFM value between 1 and 1.5, for example an iFM of approximately 1.3, is an acceptable threshold for differentiating between minimal following that has an immaterial effect, if any, on model predictions, and unacceptable following that has an effect on model predictions. The alert threshold for the iFM value may be adjusted lower, for example, to 1.1 or even lower, where the noise level of the signals is low. The alert threshold for the iFM value may be adjusted higher, for example, up to 2 or even higher, where the noise level of the signals is high. In one embodiment, the processor evaluates whether the iFM is greater than the alert threshold. The processor retrieves the value of the iFM and a value of the alert threshold. The processor compares the values of the iFM and the alert threshold. Where the value of the iFM is greater than the value of the alert threshold (iFM>Threshold?:YES), the level of following present in the ML model is unacceptably high, processing at decision block 585 completes and processing advances to process block 590. Where the value of the iFM is not greater than (that is, less than or equal to) the value of the alert threshold (iFM>Threshold?:NO), the level of following present in the ML model is acceptable, processing at decision block 585 completes and processing advances to end block 595, where process 500 ends. The processor has thus determined whether signal following is present in the trained machine learning model based on whether a ratio of the average standard deviation of measured values to the average standard deviation of the sets of residuals exceeds a threshold.

At process block 590, the processor triggers an alert regarding the level of following occurring in the ML model. In one embodiment, the processor generates an alarm, alert, or warning that the ML model under evaluation exhibits an unacceptably high amount of following. In one embodiment, the alert is a message indicating unacceptably high levels of following occurring in an ML model. The message may include an indication of the value of the iFM for the ML model, the value for the threshold, an indication of the extent of the following (whether the following is moderate or high), the signals for which following occurs, and an explanation of the significance of the following. Each of these message contents may be retrieved from memory or storage and used by the processor to generate an alert message. The alert may be text only, or include graphical elements. The alert message may take the form of a processing instruction, such as an API request or command to other parts of computing system 400. In one embodiment, the processor retrieves alert message contents from memory or storage, generates the alert message, and transmits the message for presentation to the user. In one embodiment, the message is transmitted in an email or text message to an inbox associated with the user. In one embodiment, the message is transmitted to and presented on a display in a text interface or graphical user interface for example an interface of time series data service 405. In this way, the processor has presented an alert indicating the presence of signal following in the trained machine learning model. Once the processor has thus completed triggering an alert regarding the level of following occurring in the ML model, processing at process block 590 completes, and processing continues to END block 595, where process 500 ends.

In one embodiment, the satisfaction of the alert threshold shown and described with refence to decision block 585 of process 500 triggers a mitigation analysis in addition to triggering an alert at process block 590. In response to a determination that following is present in the ML model, the system may suggest one or more of the following mitigation techniques to reduce following in the ML model: increasing a number of training vectors used to train the ML model, performing filtering operations on the training signals and monitored signals to reduce noise, and changing the number of monitored signals. In one embodiment, the recommended mitigation technique is included in the generated alert message. In this way, the alert may include the ratio (iFM) and a recommendation of a technique to mitigate the signal following in the machine learning model selected from one or more of increasing a number of training vectors in the ML model, filtering signal inputs to the ML model to reduce noise, and increasing a number of signals.

Effectiveness of iFM

To demonstrate the effectiveness of passive inferencing of signal following using the iFM, two example typical signal databases of N=20 signals each are considered herein. The original following characterization technique declares the first of these databases of signals to demonstrate almost zero following when analyzed by a ML model. The original following characterization technique shows the second of these databases of signals to induce following at least when when analyzed with MSET, LSTM neural network, and linear regression ML models. With these two datasets, two separate ML models are trained. For example the ML models may be MSET models. The first half (that is, the earlier half of the observations) of each database was used to train the ML model. The second half (that is, the later half of the observations) is used for surveillance. The ML model therefore predicts what each signal "should be" based on the trained model and the patterns present in all other N-1 signals of the signal database. The first trained model does not exhibit following to a detectable degree. The second trained model is a case where following begins to occur at an unacceptable level. The tables below track the values pertinent to the new iFM and the original following characterization technique FM, for both model instances.

Table 1 contains values pertaining to ML model following for an MSET ML model that exhibits minimal Following.

TABLE 1

| STD Coefficient of Added Gaussian Noise | Mean STD of MSET Residuals | Normalized to Case 1 | Mean STD of Original Signals in the Model | Monitored Signal STD: MSET Residual STD | "Classic" Following Metric |
|---|---|---|---|---|---|
| STD = 0.25 | 0.077 | 1.000 | 1.232 | 15.970 | 0.849 |
| STD = 0.50 | 0.068 | 0.882 | 1.306 | 19.198 | 0.919 |
| STD = 0.75 | 0.076 | 0.984 | 1.420 | 18.707 | 0.919 |
| STD = 1.0 | 0.088 | 1.141 | 1.567 | 17.796 | 0.909 |
| STD = 5.0 | 0.305 | 3.958 | 5.144 | 16.840 | 0.892 |
| STD = 10.0 | 0.604 | 7.825 | 10.075 | 16.685 | 0.887 |

Table 2 contains values pertaining to ML model Following for a model that exhibits an unacceptable degree of Following.

TABLE 2

| STD Coefficient of Added Gaussian Noise | Mean STD of MSET Residuals | Normalized to Case 1 | Mean STD of Original Signals in the Model | Original Signal STD: MSET Residual STD | "Classic" Following Metric |
|---|---|---|---|---|---|
| STD = 0.25 | 0.077 | 1.000 | 1.232 | 22.334 | 0.891 |
| STD = 0.50 | 0.068 | 1.058 | 1.306 | 22.365 | 0.930 |
| STD = 0.75 | 0.076 | 1.196 | 1.420 | 21.516 | 0.930 |
| STD = 1.0 | 0.088 | 1.374 | 1.567 | 20.667 | 0.917 |
| STD = 5.0 | 0.305 | 4.745 | 5.144 | 19.647 | 0.897 |
| STD = 10.0 | 0.604 | 9.400 | 10.075 | 19.425 | 0.894 |

The second column of the tables shows the average standard deviation of the 20 ML model residuals, calculated by subtracting the MSET estimates from the monitored portion (surveillance or second half) of the signals. The fourth column of the tables shows the average standard deviation of the original signals. As stated previously, there is a correlative relationship between the ML model residuals and the original signals such that the STD of the residuals should be similar to the STD of the original signals. As such, the ratio between the STD of the original signal and the STD of the residuals will increase if following is occurring in the ML model. This ratio is the iFM and is shown in the fifth column of the tables. While following is not contingent on the severity of measurement noise in a database it is a driving factor. If the original signal to noise ratios are poor, following will increase. To demonstrate this phenomenon the aforementioned process of ML model training and surveillance on the 20-signal database was repeated as the noise content on the signals was increased. The first column of the tables shows the standard deviation (STD) coefficient of Gaussian noise added to the signals. The sixth column of the tables records the original or "classic" following metric (FM) produced by the original following characterization technique. Comparing the FM in the sixth column to the iFM STD ratios in the fifth column yields a very similar pattern, thereby validating the theoretical basis for the iFM.

Figure 6:
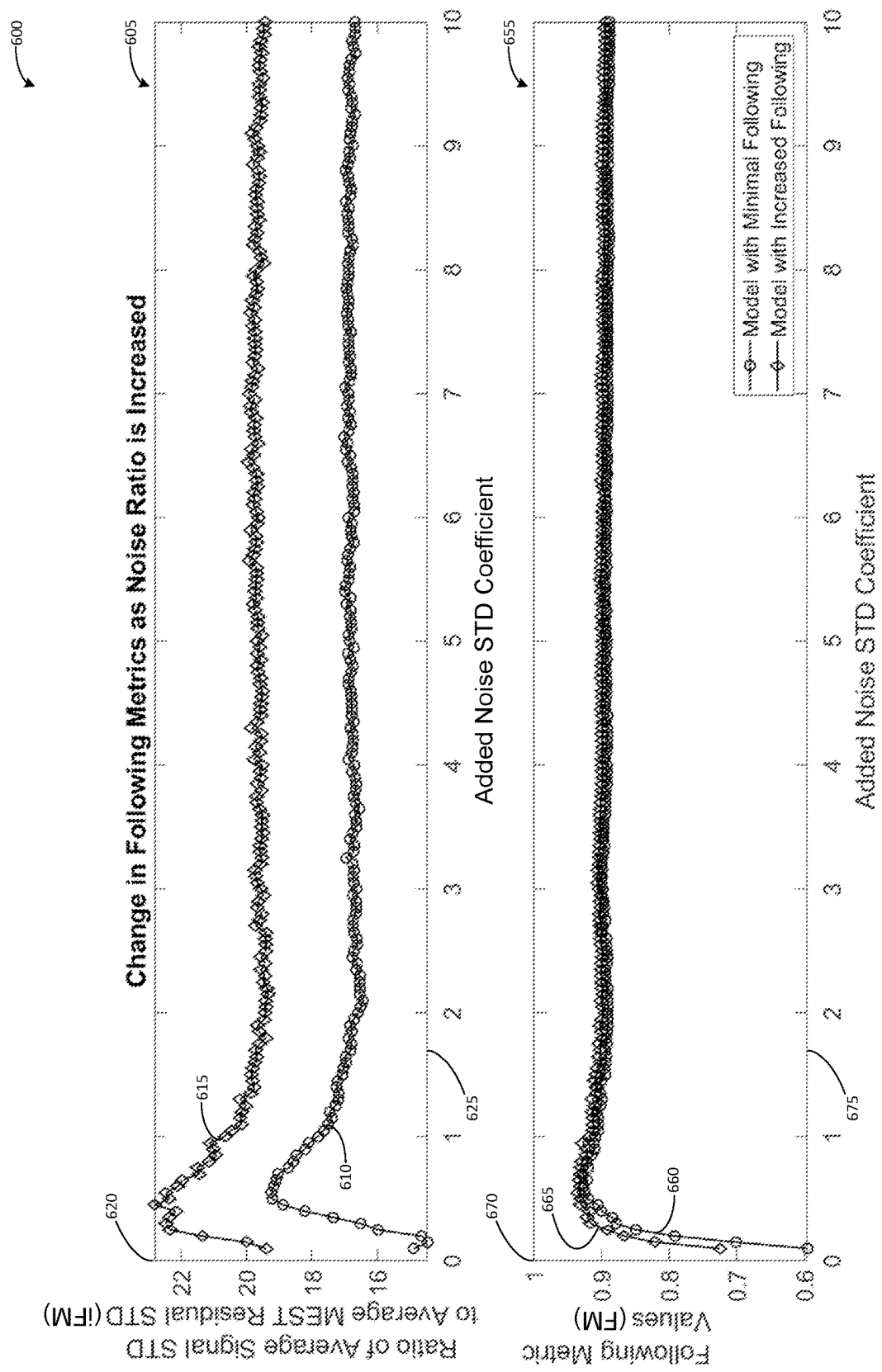
FIG. 6 illustrates a plot showing the change in following metric values as the noise ratio is increased for two ML models, indicating ability to identify noise-driven following using passive inferencing of signal following in multivariate anomaly detection.

FIG. 6 illustrates a plot 600 showing the change in following metric values as the noise ratio is increased for two ML models, indicating ability to identify noise-driven following using passive inferencing of signal following in multivariate anomaly detection. Plot 600 is a comparison of the two ML models discussed in Tables 1 and 2 above, where one ML model (denoted by diamonds in plot 600) displays a low degree of following, and the other ML model (denoted by circles in plot 600) displays a higher degree of Following. To elucidate the relationship between noise and following, the iFM and FM at different levels of noise for these two ML models are plotted against axes for the metric (either FM or iFM) value and the level of noise. In plot 600, the noise added to the original signals increases at a much finer granularity than is recorded in the tables above. Plot 600 includes two subplots: (i) at the top, an iFM subplot 605 that shows iFM values 610 for an ML model exhibiting minimal following (described in Table 1) and iFM values 615 for an ML model exhibiting unacceptably high following (described in Table 2) at progressively higher levels of noise, plotted against an iFM axis 620 and an added noise standard deviation coefficient axis 625; and (ii) at the bottom, an FM subplot 655 that shows FM values 660 for the ML model exhibiting minimal following (described in Table 1) and FM values 665 for the ML model exhibiting unacceptably high following (described in Table 2) at progressively higher levels of noise, plotted against a FM axis 670 and an added noise standard deviation coefficient axis 675.

As in the tables above, it is apparent that when the noise on the signals increases, following also increases. This behavior is apparent in iFM subplot 605, and mirrored in FM subplot 655. Advantageously, the new technique described herein for passive inferencing of signal following in multivariate anomaly detection (the iFM technique) yields greater separation (and hence discrimination capability) between the metric values for ML models that exhibit minimal following (values 610 and 660) and the metric values for ML models that exhibit significant following (values 615 and 665) than the FM produced by the original following characterization technique. This is clearly visible by comparing subplots 605 and 655. Greater separation and discrimination capability is a good feature for model characterization empirical parameters, as it enables clearer decision making based on those parameters.

A model with a very low degree of following will have an iFM that is nominally 1 or even less. Note that higher dimensional models may come out to be even lower than 1. But, where there is following, the iFM will be greater than 1. The higher the value of the iFM beyond 1, the worse the following exhibited by the model. Based on extensive parametric testing with many time series datasets with different numbers of signals, different numbers of observations, and different noise ratios, in one embodiment, an alarm condition should be set at iFM>1.3, indicating that mitigation actions are warranted such as adding more signals to the model if physically possible for the asset under surveillance, or performing moving-window smoothing to reduce the noise ratios on the signals.

Figure 7:
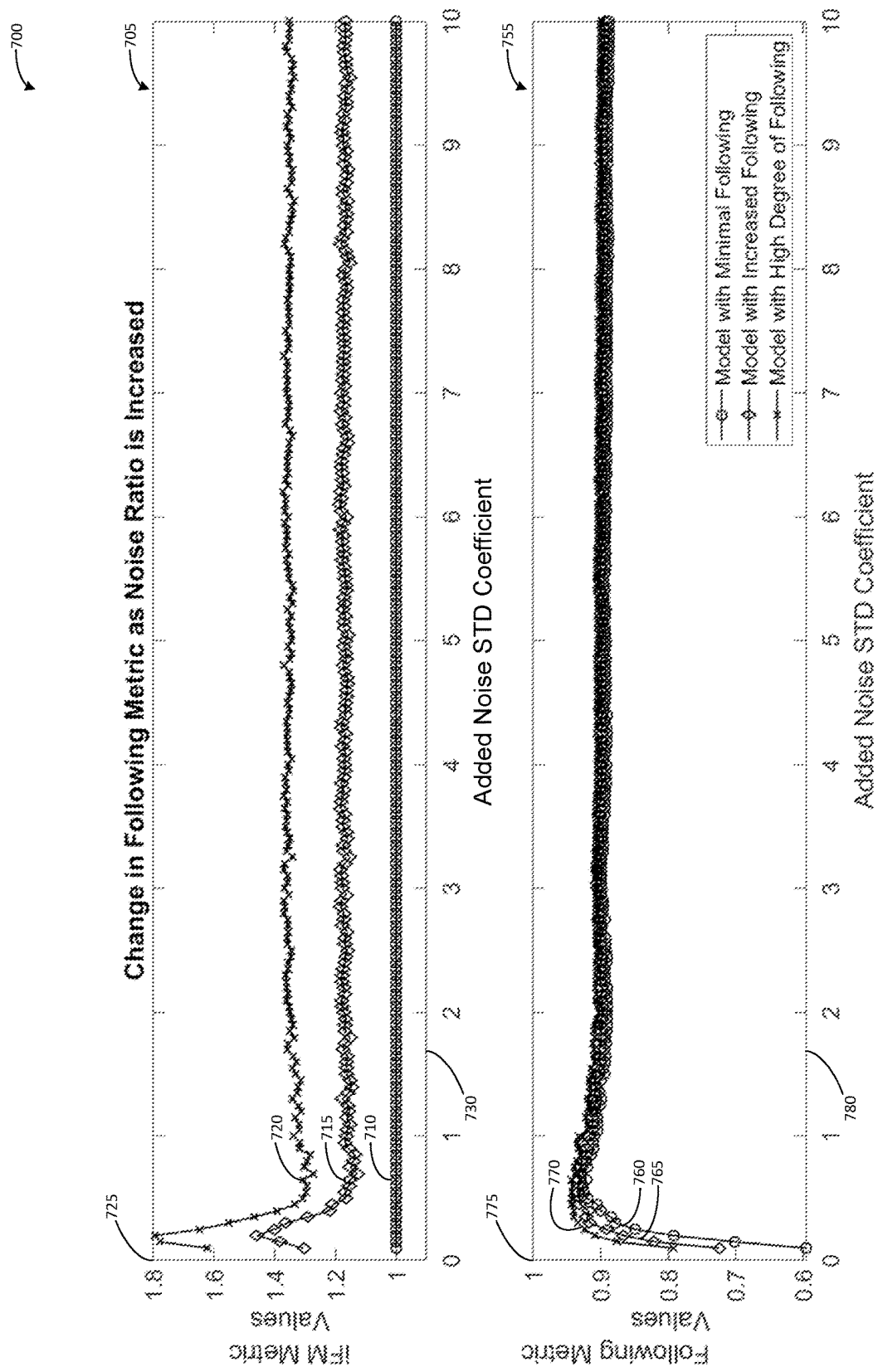
FIG. 7 illustrates a plot showing the change in following metric values as the noise ratio is increased for three ML models, demonstrating that for any given ratio of standard deviation between observed signal and residuals, the size of the curves maps monotonically with degree of following.

FIG. 7 illustrates a plot 700 showing the change in following metric values as the noise ratio is increased for three ML models, demonstrating that for any given ratio of standard deviation between observed signal and residuals (or iFM), the size of the curves maps monotonically with degree of following. Plot 700 is a comparison of three example ML models, where a first ML model (denoted by circles in plot 700) exhibits a minimal degree of following, where a second ML model (denoted by diamonds in plot 700) exhibits a moderate amount of following, and where a third ML model (denoted by crosses in plot 700) exhibits a high amount of following. Note that both the second and third model exhibit unacceptable degrees of following. Plot 700 includes two subplots: (i) at the top, an iFM subplot 705 that shows iFM values 710 for the first ML model exhibiting minimal following, iFM values 715 for the second ML model exhibiting increased following, and iFM values 720 for the third ML model exhibiting a high degree of following, each at progressively higher levels of noise, plotted against an iFM axis 725 and an added noise standard deviation coefficient axis 730; and (ii) at the bottom, an FM subplot 755 that shows FM values 760 for the first ML model exhibiting minimal following, FM values 765 for the second ML model exhibiting increased following, and iFM values 770 for the third ML model exhibiting a high degree of following, each at progressively higher levels of noise, plotted against a FM axis 775 and an added noise standard deviation coefficient axis 780.

As can be seen by comparing the iFM subplot 705 and the FM subplot 755, for any given iFM or ratio between the standard deviation of the observed signals and the standard deviation of the residuals between the ML model prediction and observed signals, the size of the iFM curves 710, 715, 720 map monotonically with the degree of following shown by the FM values 760, 765, 770 produced by the original following characterization technique. The family of iFM curves will have a different spread for smaller models and for larger models. Hence, the systems and methods for passive inferencing of signal following in multivariate anomaly detection described herein, and parametric inferential following metric characterization and mitigation use cases it involves makes up a systematic quantitative framework for assessing the iFM parametric curves. In one embodiment, families of curves may be generated according to the systems and methods described herein for each possible number of monitored signals (up to a reasonable maximum, perhaps tens or hundreds of millions of monitored signals), and the families of curves stored in a library. Then for any given use case (for example, with 23 signals, or 8, or 150, or 5000, etc., the proper family of curves may be retrieved from the library to indicate the quantitative degree of following (the FM) by entering an iFM value. Thus, the inferential metric (iFM) can be used by the processor to look up the quantitative metric (the FM). The processor then retrieves the quantitative degree of following (FM) for the machine learning model based on the value of the ratio (iFM). The FM can then be presented in an alert regarding unacceptable levels of following along with the iFM that triggered the alert.

High-Level Process for Inferencing Following in a ML Model

Figure 8:
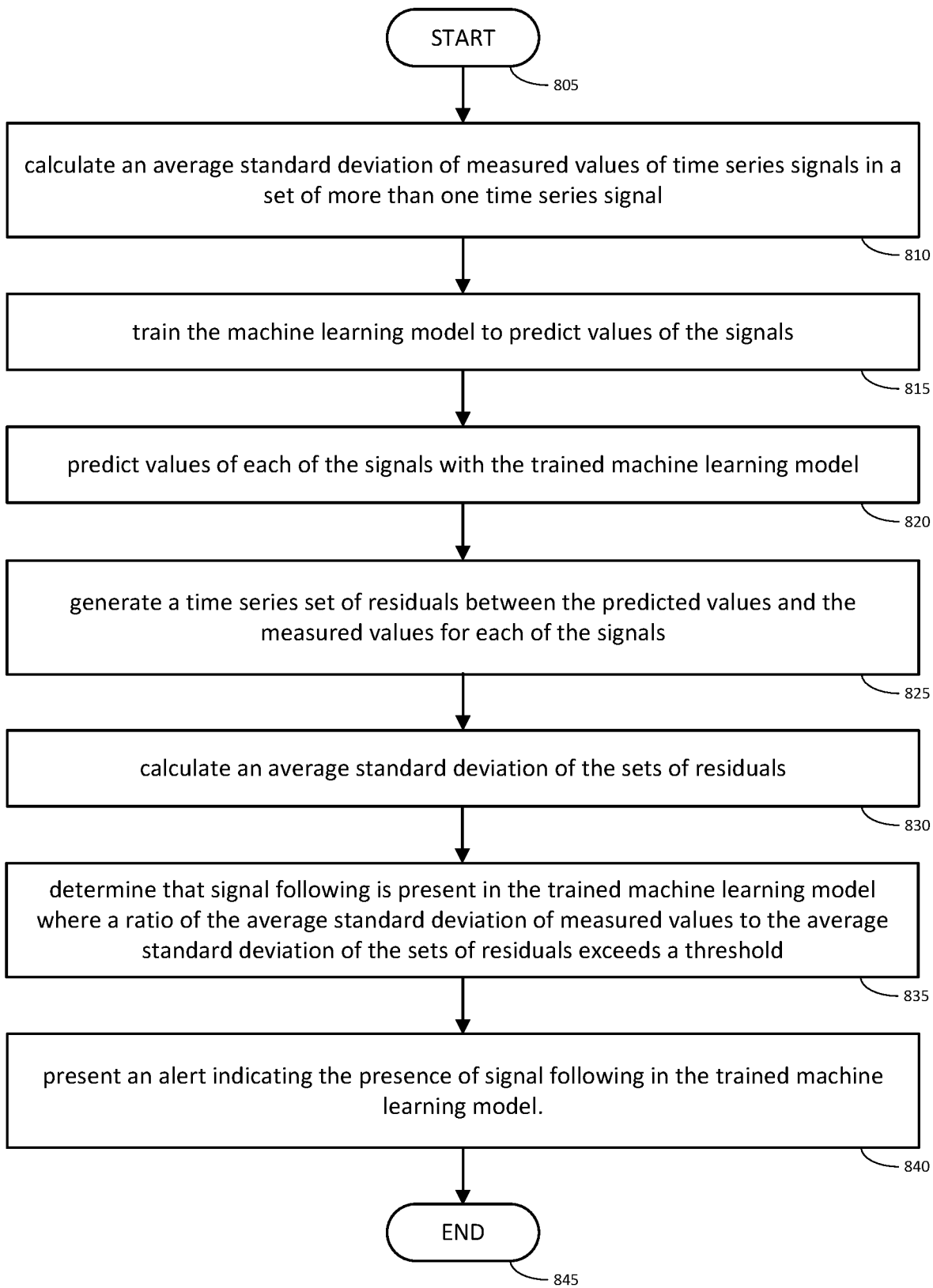
FIG. 8 illustrates one embodiment of a method associated with passive inferencing of signal following in multivariate anomaly detection.

FIG. 8 illustrates one embodiment of a method 800 associated with passive inferencing of signal following in multivariate anomaly detection. Method 800 shows a high level overview of a process for calculating and tracking the iFM for any database of time series signals. In one embodiment, the steps of method 800 are performed by passive signal inferencing components 440 (as shown and described with reference to FIG. 4). In one embodiment, the method 800 may be initiated automatically based on various triggers, such as those described above with reference to method 500. The method 800 initiates at start block 805 and proceeds to process block 810. At process block 810, the processor calculates an average standard deviation of measured values of time series signals in a set of more than one time series signal, for example as shown and described with reference to blocks 515, 520, 525, 530, and 535 of method 500. Next, at process block 815, the processor trains the machine learning model to predict values of the time series signals, for example as shown and described with reference to block 540 of method 500. Processing then proceeds to process block 820, where the processor predicts values of each of the signals with the trained machine learning model, for example as shown and described with reference to block 545 of method 500. Processing continues at process block 825, where the processor generates a time series set of residuals between the predicted values and the measured values for each of the signals, for example as shown and described with reference to block 550, of method 500. Next, at process block 830, the processor calculates an average standard deviation of the sets of residuals, for example as shown and described with reference to blocks 555, 560, 565, 570, and 575 of method 500. Processing then continues at process block 835, where the processor determines that signal following is present in the trained machine learning model where a ratio of the average standard deviation of measured values to the average standard deviation of the sets of residuals exceeds a threshold, for example as shown and described with reference to blocks 580 and 585 of method 500. Processing then continues at process block 840, where the processor presents an alert indicating the presence of signal following in the trained machine learning model, for example as shown and described with reference to block 590 of method 500. Processing then continues to END block 845, where method 800 completes.

Selected Advantages

The systems and methods described herein for passive inferencing of signal following in multivariate anomaly detection demonstrate a number of advantages. For example, ML Anomaly Detection algorithms enhanced with the passive inferencing of signal following described herein exhibit a lower Type-II error probability (that is, missed alarm probability or "MAP") than conventional best practices. Oracle's Anomaly Detection Service (ADS), as well as prognostic anomaly discovery tools of GE PREDIX, Microsoft Azure, Amazon AWS_Sitewise, SAP/Siemens Intelligent Asset Management, or any IoT cloud operations where customers analyze large-scale time series databases for machine learning prognostics can be improved as described above by implementing the systems and methods passive inferencing of signal following in multivariate anomaly detection described herein. Detection and characterization of signal following in prognostic ML models for large-scale time series databases is enables by the systems and methods described herein, where such detection and characterization of signal following was not previously feasible for large-scale time series data sets.

Computing Device Embodiment

Figure 9:
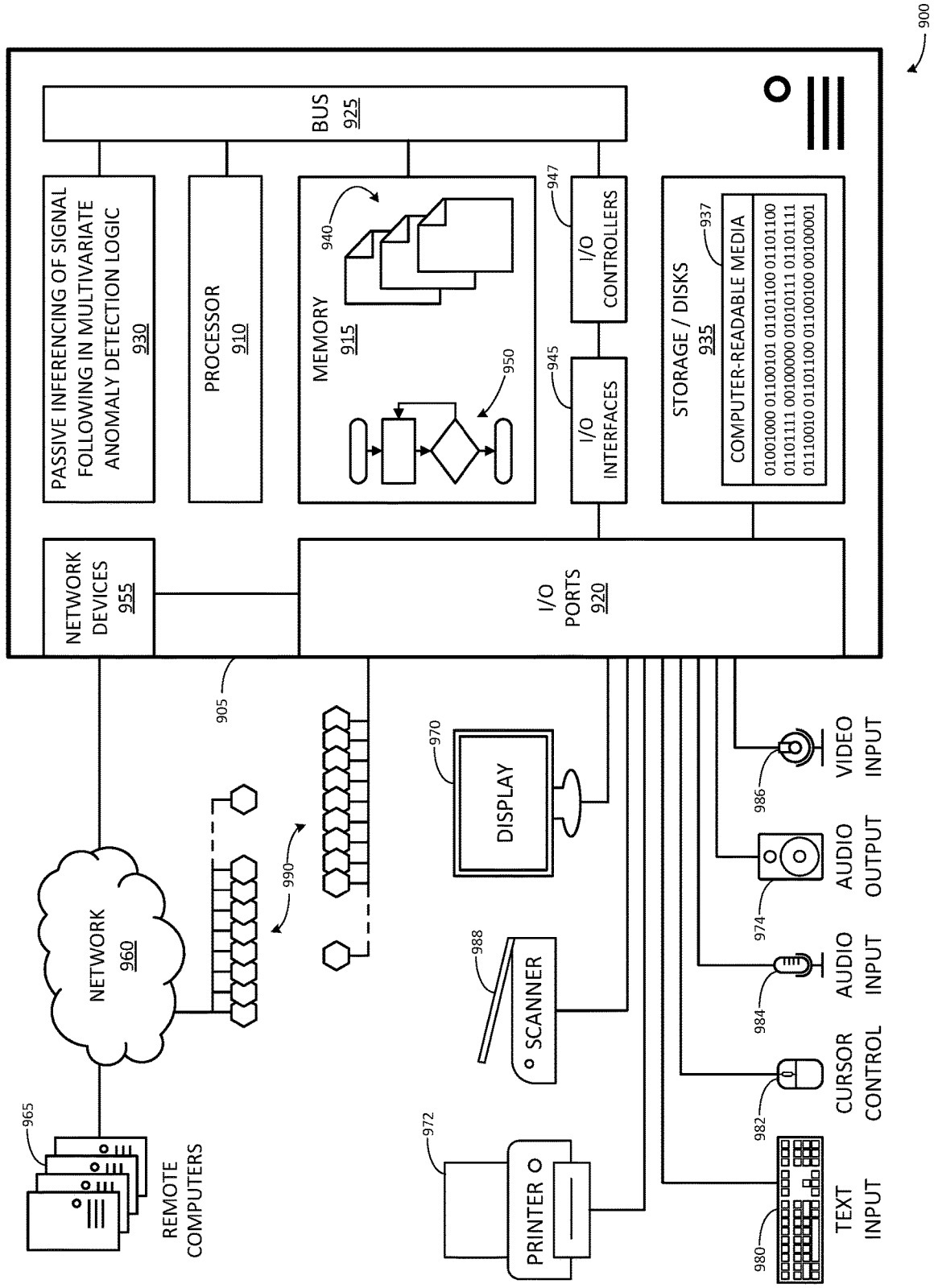
FIG. 9 illustrates an embodiment of a computing system configured with the example systems and/or methods disclosed.

FIG. 9 illustrates an example computing device 900 that is configured and/or programmed as a special purpose computing device with one or more of the example systems and methods described herein, and/or equivalents. The example computing device may be a computer 905 that includes a processor 910, a memory 915, and input/output ports 920 operably connected by a bus 925. In one example, the computer 905 may include passive inferencing of signal following in multivariate anomaly detection logic 930 configured to facilitate passive inferencing of signal following in multivariate anomaly detection similar to the logic, systems, and methods shown and described with reference to FIGS. 4-8. In different examples, the logic 930 may be implemented in hardware, a non-transitory computer-readable medium with stored instructions 937, firmware, and/or combinations thereof. While the logic 930 is illustrated as a hardware component attached to the bus 908, it is to be appreciated that in other embodiments, the logic 930 could be implemented in the processor 902, stored in memory 904, or stored in disk 906.

In one embodiment, logic 930 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to provide passive inferencing of signal following in multivariate anomaly detection. The means may also be implemented as stored computer executable instructions that are presented to computer 900 as data 916 that are temporarily stored in memory 904 and then executed by processor 902.

Logic 930 may also provide means (e.g., hardware, non-transitory computer-readable medium that stores executable instructions, firmware) for performing passive inferencing of signal following in multivariate anomaly detection.

Generally describing an example configuration of the computer 900, the processor 902 may be a variety of various processors including dual microprocessor and other multiprocessor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 through, for example, an input/output (I/O) interface (e.g., card, device) 918 and an input/output port 910 that are controlled by at least an input/output (I/O) controller 940. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with, control, and/or be controlled by input/output (I/O) devices via the input/output (I/O) controller 940, the I/O interfaces 918 and the input/output ports 910. The input/output devices may include one or more displays 970, printers 972 (such as inkjet, laser, or 3D printers), and audio output devices 974 (such as speakers or headphones), text input devices 980 (such as keyboards), a pointing and selection device 982 (such as mice, trackballs, touchpads, touch screens, joysticks, pointing sticks, stylus mice), audio input devices 984 (such as microphones), video input devices 986 (such as video and still cameras), video cards (not shown), disk 935, network devices 920, sensors 990, and so on. The input/output ports 910 may include, for example, serial ports, parallel ports, and USB ports.

The computer 900 can operate in a network environment and thus may be connected to the network devices 920 via the I/O interfaces 918, and/or the I/O ports 910. Through the network devices 920, the computer 900 may interact with a network 960. Through the network 960, the computer 900 may be logically connected to remote computers 965 and sensors 990. Networks with which the computer 900 may interact include, but are not limited to, a LAN, a WAN, and other networks. In one embodiment, the computer 900 may be connected to sensors 990 through I/O ports 910 or networks 960 in order to receive sensed information from and/or control sensors 990.

Software Module Embodiments

In general, software instructions are designed to be executed by one or more suitably programmed processor accessing memory. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (time series data service 105) is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

AAKR: autoassociative kernel regression.
API: application programming interface.
ASIC: application specific integrated circuit.
CD: compact disk.
CD-R: CD recordable.
CD-RW: CD rewriteable.
CoAP: constrained application protocol.
CPU: central processing unit.
DAQ: data acquisition.
DDS: data distribution service.
DPWS: devices profile for web services.
DRAM: dynamic RAM.
DVD: digital versatile disk and/or digital video disk.
EPROM: erasable PROM.
EEPROM: electrically erasable PROM.
FM: following metric.
GPU: graphics processing unit.
HPC: high performance computing.
HTTP: hypertext transfer protocol.
I/O: input/output.
IAAS: infrastructure as a service.
iFM: inferential following metric.
IoT: Internet of things.
JSON: java script object notation.
LAN: local area network.
M2M: machine to machine.
ML: machine learning.
MSET: multivariate state estimation technique.
MSET2: Oracle's proprietary multivariate state estimation technique.
MQTT: message queuing telemetry transport.
NLNP: nonlinear nonparametric.
NN: neural network.
PAAS: platform as a service.
PCI: peripheral component interconnect.
PCIE: PCI express.
PROM: programmable ROM.
RAM: random access memory.
REST: representational state transfer.
ROM: read only memory.
RTU: remote terminal unit.
SAAS: software as a service.
SBM: similarity-based modeling.
SCADA: supervisory control and data acquisition.
SNR: signal-to-noise ratio.
SOAP: simple object access protocol.
SPRT: sequential probability ratio test.
SRAM: synchronous RAM.
SQL: structured query language.
STD: standard deviation.
SVM: support vector machine.
TCP/IP: transmission control protocol/Internet protocol.
UDP: user datagram protocol.
UPnP: universal plug and play.
USB: universal serial bus.
XML: extensible markup language.
XMPP: extensible messaging and presence protocol
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method for inferencing signal following in a machine learning model, the method comprising:
   calculating an average standard deviation of measured values of time series signals in a set of more than one time series signal;
   training the machine learning model to predict values of the time series signals, by:
      feeding an observation interval of the time series signals that represents a normal operating state into the machine learning model for the training, and
      configuring the machine learning model to generate for individual signals of the time series signals an output signal value that would be expected in the normal operating state based on input signal values and correlations among the time series signals other than the individual signals;
   predicting values of each of the time series signals with the trained machine learning model;
   generating a time series set of residuals between the predicted values and the measured values for each of the time series signals;
   calculating an average standard deviation of the sets of residuals;
   determining that signal following is present in the trained machine learning model where a ratio of the average standard deviation of measured values to the average standard deviation of the sets of residuals exceeds a threshold; and
   presenting an alert indicating the presence of signal following in the trained machine learning model.

2. The computer-implemented method of claim 1, further comprising calculating the ratio by dividing the average standard deviation of measured values by the average standard deviation of the sets of residuals, wherein the threshold exceeded by the ratio is between 1 and 1.5.

3. The computer-implemented method of claim 1, further comprising retrieving a quantitative degree of following for the machine learning model based on a value of the ratio.

4. The computer-implemented method of claim 1, wherein the training of the machine learning model and predicting of values occurs only once when inferencing signal following in the machine learning model.

5. The computer-implemented method of claim 1, wherein the alert includes the ratio and a recommendation of a technique to mitigate the signal following in the machine learning model selected from increasing a number of training vectors in the machine learning model, filtering signal inputs to the machine learing model to reduce noise, and increasing a number of signals.

6. The computer-implemented method of claim 1, wherein the machine learning model is a multivariate state estimation technique model.

7. The computer-implemented method of claim 1, wherein the machine learning model is a non-linear non-parametric regression model.

8. A non-transitory computer-readable medium that includes stored thereon computer-executable instructions that when executed by at least a processor of a computer cause the computer to:
   calculate an average standard deviation of measured values of time series signals in a set of more than one time series signal;

train a machine learning model to predict values of the time series signals, by:
  feeding an observation interval of the time series signals that represents a normal operating state into the machine learning model for the training, and
  configuring the machine learning model to generate for individual signals of the time series signals an output signal value that would be expected in the normal operating state based on input signal values and correlations among the time series signals other than the individual signals;
predict values of each of the time series signals with the trained machine learning model;
generate a time series set of residuals between the predicted values and the measured values for each of the time series signals;
calculate an average standard deviation of the sets of residuals;
determine that signal following is present in the trained machine learning model where a ratio of the average standard deviation of measured values to the average standard deviation of the sets of residuals exceeds a threshold; and
present an alert indicating the presence of signal following in the trained machine learning model.

9. The non-transitory computer-readable medium of claim 8, wherein the instructions further cause the computer to calculate the ratio by dividing the average standard deviation of measured values by the average standard deviation of the sets of residuals, and wherein the threshold exceeded by the ratio is between 1 and 1.5.

10. The non-transitory computer-readable medium of claim 8, wherein the instructions further cause the computer to retrieve a quantitative degree of following for the machine learning model based on a value of the ratio.

11. The non-transitory computer-readable medium of claim 8, wherein the training of the machine learning model and predicting of values occurs only once when inferencing signal following in the machine learning model.

12. The non-transitory computer-readable medium of claim 8, wherein the alert includes the ratio and a recommendation of a technique to mitigate the signal following in the machine learning model selected from increasing a number of training vectors in the machine learning model, filtering signal inputs to the machine learning model to reduce noise, and increasing a number of signals.

13. The non-transitory computer-readable medium of claim 8, wherein the machine learning model is a multivariate state estimation technique model.

14. The non-transitory computer-readable medium of claim 8, wherein the machine learning model is a non-linear non-parametric regression model.

15. A computing system comprising:
a processor;
a memory operably connected to the processor;
a non-transitory computer-readable medium operably connected to the processor and memory and storing computer-executable instructions that when executed by at least a processor of a computer cause the computing system to:
calculate an average standard deviation of measured values of time series signals in a set of more than one time series signal;
train a machine learning model to predict values of the time series signals, by:
  feeding an observation interval of the time series signals that represents a normal operating state into the machine learning model for the training, and
  configuring the machine learning model to generate for individual signals of the time series signals an output signal value that would be expected in the normal operating state based on input signal values and correlations among the time series signals other than the individual signals;
predict values of each of the time series signals with the trained machine learning model;
generate a time series set of residuals between the predicted values and the measured values for each of the time series signals;
calculate an average standard deviation of the sets of residuals;
determine that signal following is present in the trained machine learning model where a ratio of the average standard deviation of measured values to the average standard deviation of the sets of residuals exceeds a threshold; and
present an alert indicating the presence of signal following in the trained machine learning model.

16. The computing system of claim 15, wherein the instructions further cause the computing system to calculate the ratio by dividing the average standard deviation of measured values by the average standard deviation of the sets of residuals, and wherein the threshold exceeded by the ratio is between 1 and 1.5.

17. The computing system of claim 15, wherein the instructions further cause the computing system to retrieve a quantitative degree of following for the machine learning model based on a value of the ratio.

18. The computing system of claim 15, wherein the alert includes the ratio and a recommendation of a technique to mitigate the signal following in the machine learning model selected from increasing a number of training vectors in the machine learning model, filtering signal inputs to the machine learning model to reduce noise, and increasing a number of signals.

19. The computing system of claim 15, wherein the machine learning model is a multivariate state estimation technique model.

20. The computing system of claim 15, wherein the machine learning model is a non-linear non-parametric regression model.

* * * * *